United States Patent
Chu et al.

(10) Patent No.: US 10,524,290 B1
(45) Date of Patent: Dec. 31, 2019

(54) METHOD AND APPARATUS FOR UPLINK ORTHOGONAL FREQUENCY DIVISION MULTIPLE ACCESS COMMUNICATION IN A WLAN

(71) Applicant: Marvell International Ltd., Hamilton (BM)

(72) Inventors: Liwen Chu, San Ramon, CA (US); Lei Wang, San Diego, CA (US); Hongyuan Zhang, Fremont, CA (US); Jinjing Jiang, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 234 days.

(21) Appl. No.: 15/337,474

(22) Filed: Oct. 28, 2016

Related U.S. Application Data

(63) Continuation of application No. 14/963,045, filed on Dec. 8, 2015.
(Continued)

(51) Int. Cl.
*H04B 17/318* (2015.01)
*H04W 74/08* (2009.01)
(Continued)

(52) U.S. Cl.
CPC ...... *H04W 74/0816* (2013.01); *H04B 17/318* (2015.01); *H04L 5/0007* (2013.01); *H04W 74/004* (2013.01); *H04W 84/12* (2013.01)

(58) Field of Classification Search
None
See application file for complete search history.

(56) References Cited

U.S. PATENT DOCUMENTS

2004/0004973 A1  1/2004 Lee
2007/0071010 A1  3/2007 Iyer et al.
(Continued)

FOREIGN PATENT DOCUMENTS

KR  10-2014-0080172  *  6/2014
WO  WO 2015/147874 A1  10/2015

OTHER PUBLICATIONS

Seok, Yongho, "RTS and CTS Procedure for Dynamic CCA", U.S. Appl. No. 62/086,516, filed Dec. 2, 2014 (Year: 2014).*
(Continued)

*Primary Examiner* — Gregory B Sefcheck
*Assistant Examiner* — Jenkey Van

(57) ABSTRACT

A communication device performs a clear channel assessment (CCA) procedure to determine whether the communication device can transmit in a shared wireless communication medium, wherein the communication device is in a first basic service set (BSS) associated with a virtual access point (AP) implemented by a physical AP, and wherein the first BSS corresponds to a first BSS identifier. Performing the CCA procedure includes: for first signals having the first BSS identifier or having one or more second BSS identifiers corresponding to other virtual APs implemented by the physical AP, comparing energy of the signals to a first threshold; and for first signals determined by the communication device to have one or more third BSS identifiers, wherein the one or more third BSS identifiers correspond to other physical APs, comparing energy of the signals to a second threshold lower than the first threshold.

14 Claims, 17 Drawing Sheets

Related U.S. Application Data

(60) Provisional application No. 62/089,026, filed on Dec. 8, 2014.

(51) Int. Cl.
*H04L 5/00* (2006.01)
*H04W 74/00* (2009.01)
*H04W 84/12* (2009.01)

(56) References Cited

U.S. PATENT DOCUMENTS

| | | | |
|---|---|---|---|
| 2007/0110091 A1 | 5/2007 | Kwon | |
| 2008/0144591 A1 | 6/2008 | Jokela | |
| 2010/0020746 A1* | 1/2010 | Zaks | G06Q 30/02 370/328 |
| 2012/0099507 A1 | 4/2012 | Zhang et al. | |
| 2012/0327870 A1 | 12/2012 | Grandhi et al. | |
| 2013/0229996 A1 | 9/2013 | Wang et al. | |
| 2014/0119288 A1* | 5/2014 | Zhu | H04W 72/0406 370/329 |
| 2014/0286203 A1* | 9/2014 | Jindal | H04J 11/0026 370/278 |
| 2014/0328270 A1 | 11/2014 | Zhu et al. | |
| 2015/0103727 A1* | 4/2015 | Zhang | H04L 12/1854 370/312 |
| 2015/0131517 A1 | 5/2015 | Chu et al. | |
| 2015/0163824 A1 | 6/2015 | Krzymien et al. | |
| 2016/0007379 A1 | 1/2016 | Seok | |
| 2016/0014804 A1* | 1/2016 | Merlin | H04L 5/0044 370/329 |
| 2016/0050691 A1 | 2/2016 | Jauh et al. | |
| 2016/0065467 A1 | 3/2016 | Wu et al. | |
| 2016/0174254 A1 | 6/2016 | Hedayat | |
| 2016/0353275 A1 | 12/2016 | Liu et al. | |
| 2017/0105143 A1* | 4/2017 | Seok | H04W 80/02 |
| 2017/0289987 A1* | 10/2017 | Seok | H04W 74/00 |

OTHER PUBLICATIONS

U.S. Appl. No. 15/019,768, filed Feb. 9, 2016.
U.S. Appl. No. 14/963,045, filed Dec. 8, 2015.
U.S. Appl. No. 14/961,558, filed Dec. 7, 2015.
U.S. Appl. No. 14/961,512, filed Dec. 7, 2015.
U.S. Appl. No. 14/961,635, filed Dec. 7, 2015.
U.S. Appl. No. 14/961,380, filed Dec. 7, 2015.
U.S. Appl. No. 14/961,359, filed Dec. 7, 2015.
U.S. Appl. No. 14/882,123, filed Oct. 13, 2015.
U.S. Appl. No. 14/600,766, filed Jan. 20, 2015.
Chun et al., "Legacy Support on HEW frame structure," doc: IEEE 11-13/1057r0, *The Institute of Electrical and Electronics Engineers, Inc.*, pp. 1-8 (Sep. 2013).
Hiertz et al., "The IEEE 802.11 Universe," IEEE Communications Magazine, pp. 62-70, (Jan. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
Itagaki et al., "Dynamic CCA Control and TPC Simulation Results with SS1~SS3," IEEE Draft, IEEE 802.11-15/1045r0 Submission, 54 pages (Sep. 14, 2015).

* cited by examiner

| Element ID | Length | Max BSSID indicator | Nontransmitted BSSID Profile |
|---|---|---|---|
| 1 | 1 | 1 | variable |

Octets:

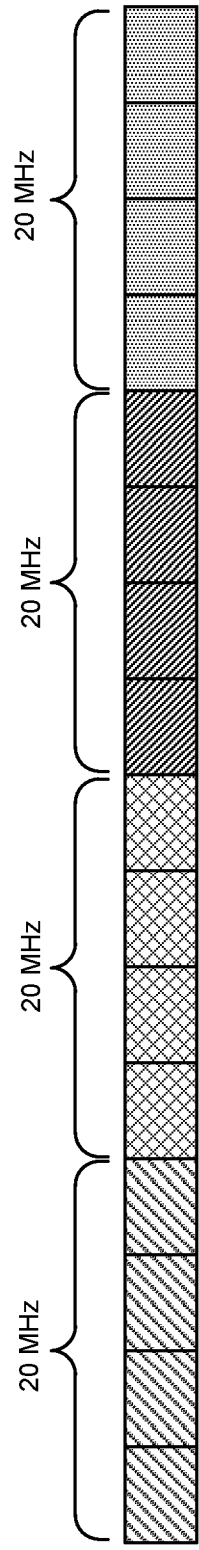
FIG. 5A
FIG. 5B
FIG. 5C
Legend for Figs. 5A-5C:

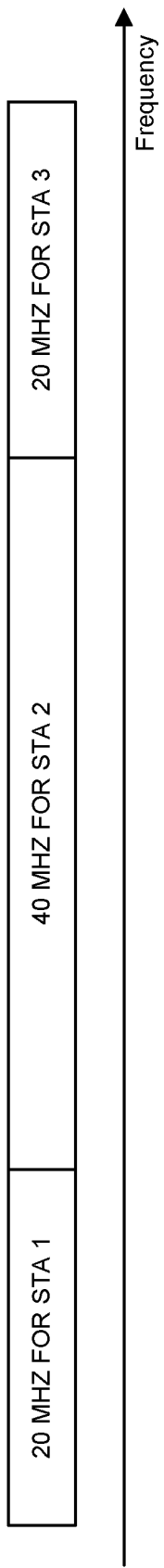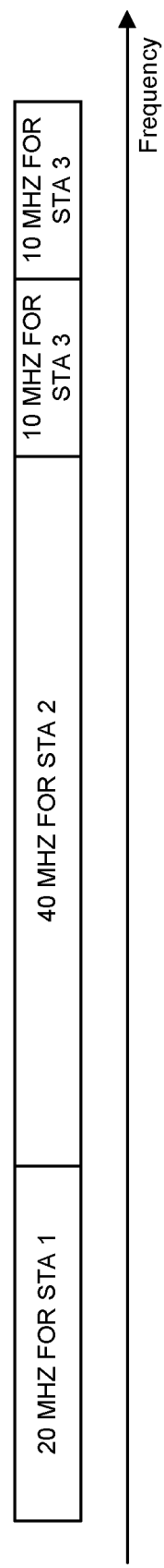
FIG. 6C
FIG. 6D

METHOD AND APPARATUS FOR UPLINK ORTHOGONAL FREQUENCY DIVISION MULTIPLE ACCESS COMMUNICATION IN A WLAN

CROSS-REFERENCE TO RELATED APPLICATION

This application is a continuation of U.S. patent application Ser. No. 14/963,045, filed Dec. 8, 2015, entitled "Methods and Devices for Determining Channel State," which claims the benefit of U.S. Provisional Patent Application No. 62/089,026, filed Dec. 8, 2014, entitled "BSS Color and Multiple BSSID." The disclosures of both of the applications referenced above are hereby expressly incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

The Institute for Electrical and Electronics Engineers (IEEE) 802.11 family of Standards (generally "802.11") has gone through several iterations over the last decade. In some of the 802.11 standards, such as 802.11ah and beyond, the identity of the Basic Service Set (BSS) (e.g., as managed by an access point (AP) of the BSS) is indicated in a Physical Layer Convergence Procedure (PLCP) Protocol Data Unit (PPDU) by a set of bits that described the "color" of the BSS. The color of a BSS corresponds to an identifier (ID) of the BSS that is shorter than a BSS identifier (BSSID) defined by 802.11. The BSS color may be contained in the Physical Layer (PHY) Signal (SIG) field in a PHY header of a PPDU, whereas the BSSID is typically included in a media access control (MAC) portion of PPDUs. A device (e.g., an AP or client) in a BSS can determine whether a PPDU is from the BSS to which the device belongs (the "same-BSS") or some other BSS (e.g., an overlapping BSS (OBSS)), a device (e.g., an AP or client) by decoding the SIG field and interpreting BSS color bits included therein.

One of the newer implementations of 802.11 being discussed is 802.11ax (sometimes referred to as 802.11 HE or 802.11 HEW). 802.11ax contemplates dynamically adjusting the energy level at which a channel is deemed to be clear depending on whether the energy corresponds to same-BSS signals or to signals from another BSS. Such a scheme helps to promote spatial reuse between neighboring networks.

SUMMARY

In an embodiment, a method includes: determining, at an access point (AP) device, a plurality of respective identifiers of a plurality of respective basic service sets (BSSs) corresponding to a plurality of respective virtual APs implemented by the AP device; broadcasting, with the AP device, the plurality of respective identifiers of the plurality of respective BSSs so that client devices of the plurality of virtual APs are made aware of all of the identifiers of the plurality of respective BSSs; and indicating to one or more client communication devices, with the AP device, a single identifier, from among the plurality of respective identifiers, that is to be used in one or more multi-user transmissions.

In another embodiment, a method includes: determining, at an access point (AP) device, a plurality of identifiers of a plurality of respective basic service sets (BSSs) corresponding to a plurality of respective virtual APs implemented by the AP device; generating, at the AP device, an orthogonal frequency division multiple access (OFDMA) physical layer (PHY) data unit or a multi-user multiple input multiple output (MU-MIMO) PHY data unit that includes data from multiple virtual APs among the plurality of virtual APs, wherein generating the OFDMA PHY data unit or the MU MIMO PHY data unit comprises generating a PHY preamble that includes one or more fields for specifying an identifier of a BSS, wherein the one or more fields are set to a same value; and transmitting, with the AP device, the OFDMA PHY data unit or the MU MIMO PHY data unit to a group of client devices among the plurality of client devices.

In yet another embodiment, a method includes: performing, at the communication device, a clear channel assessment (CCA) procedure to determine whether the communication device can transmit in a shared wireless communication medium, wherein the communication device is in a first basic service set (BSS) associated with a virtual access point (AP) implemented by a physical AP, wherein the first BSS corresponds to a first BSS identifier, and wherein performing the CCA procedure includes: for first signals determined by the communication device to have the first BSS identifier in PHY preambles of the signals, comparing energy of the signals to a first threshold, for first signals determined by the communication device to have one or more second BSS identifiers in PHY preambles of the signals, wherein the one or more second BSS identifiers correspond to one or more second BSSs of one or more other virtual APs implemented by the physical AP, comparing energy of the signals to the first threshold, and for first signals determined by the communication device to have one or more third BSS identifiers in PHY preambles of the signals, wherein the one or more third BSS identifiers correspond to one or more third BSSs corresponding to one or more other physical APs, comparing energy of the signals to a second threshold lower than the first threshold.

In still another embodiment, a method includes: associating, at a communication device, with a virtual access point (AP) implemented by a physical AP, the virtual AP corresponding to a first basic service set (BSS), wherein the first BSS corresponds to a first BSS identifier; as part of an uplink (UL) orthogonal frequency division multiple access (OFDMA) transmission to the physical AP, generating, at the communication device, a signal having i) a physical layer (PHY) preamble with a field including a second BSS identifier, and ii) a PHY payload corresponding to the first BSS; and transmitting, with the communication device, the signal to the physical AP as part of the UL OFDMA transmission.

In another embodiment, a method for communicating on a wireless network is carried out on a physical AP, and includes: setting up a plurality of virtual access points; assigning a BSS color to each of the plurality of virtual access points; and broadcasting a message that identifies each of the plurality of access points and the BSS color assigned to each of the plurality of access points.

In yet another embodiment, a method of determining whether a wireless communication medium is clear is carried out on a client device, and includes: associating with a first virtual access point (AP) of a plurality of virtual APs implemented by a physical AP; receiving, from a physical AP, a message identifying the basic service set (BSS) color of each of the plurality of virtual APs implemented by the physical AP; detecting a packet data unit; measuring the energy of the packet data unit; decoding a BSS color from the packet data unit; if the decoded BSS color is the same as a BSS color in the message from the physical AP, then setting an energy threshold to a first level; if the decoded BSS color is not the same as any BSS color in the message from the physical AP, then setting an energy threshold to a second level, wherein the second level is higher than the first level; and transmitting or refraining from transmitting a packet data unit based on a comparison of the measured energy and the energy threshold.

In still another embodiment, a method of determining whether a wireless communication medium is clear is carried out on a client device, and includes: associating with a first virtual access point (AP) of a plurality of virtual APs implemented by a physical AP, wherein the first virtual AP has a virtual AP identifier; detecting a packet data unit that includes a header comprising a basic service set (BSS) color field, wherein the BSS color field comprises a virtual AP identifier part and a segment identifier part; measuring the energy of the packet data unit; decoding the virtual AP part; if the decoded virtual AP part is the same as the virtual AP identifier of the first virtual AP, then setting an energy threshold to a first level; if the decoded virtual AP part is not the same as the virtual AP identifier of the first virtual AP, then setting an energy threshold to a second level, wherein the second level is higher than the first level; and transmitting or refraining from transmitting a packet data unit based on a comparison of the measured energy and the energy threshold.

In various other embodiments, an apparatus comprise one or more integrated circuits configured to implement one or more of the methods described above.

BRIEF DESCRIPTION OF THE DRAWINGS

FIG. 2 is diagram of an example multiple basic service set identifier (BSSID) element that is communicated in a wireless network, according to an embodiment.

FIGS. 5A-5C are diagrams of example channel allocation schemes in an 80 MHz communication channel, according to various embodiments.

FIGS. 6A, 6B, 6C, and 6D are diagrams illustrating example OFDM sub-channels of an 80 MHz communication channel, according to various embodiments.

DETAILED DESCRIPTION

In an environment in which a single physical access point (AP) implements a plurality of virtual APs managing a plurality of basic service sets (BSSs), various techniques described below assist a client device associated with one of the virtual APs to quickly determine whether a transmission corresponds to one of the BSSs managed by the AP or a BSS managed by another physical AP, according to various embodiments. For example, physical layer (PHY) headers of PHY data units may include respective identifiers of the respective BSSs to which the PHY data units correspond, according to some embodiments. When receiving a PHY data unit, a client device may examine the identifier of the BSS in the PHY header to determine whether the PHY data unit corresponds to a BSS managed by the physical AP with which the client device is associated, according to some embodiments. Quickly determining whether a transmission corresponds to one of the BSSs managed by the AP or a BSS managed by another physical AP may be useful, for example, in some clear channel assessment (CCA) procedures, according to some embodiments. For instance, as merely an illustrative scenario, for a received signal at a given power level, a client device may determine that a communication channel is busy if the client device determines that the signal corresponds to a transmission in a BSS served by the physical AP to which the client device is associated; whereas if the client device determines that the signal corresponds to a transmission in a BSS served by a different physical AP, the client device may determine that a communication channel is clear, according to an illustrative embodiment.

In some embodiments, to facilitate multi-user transmissions having data from multiple BSSs served by a single physical AP, a PHY preamble may include only one BSS identifier.

Figure 1:
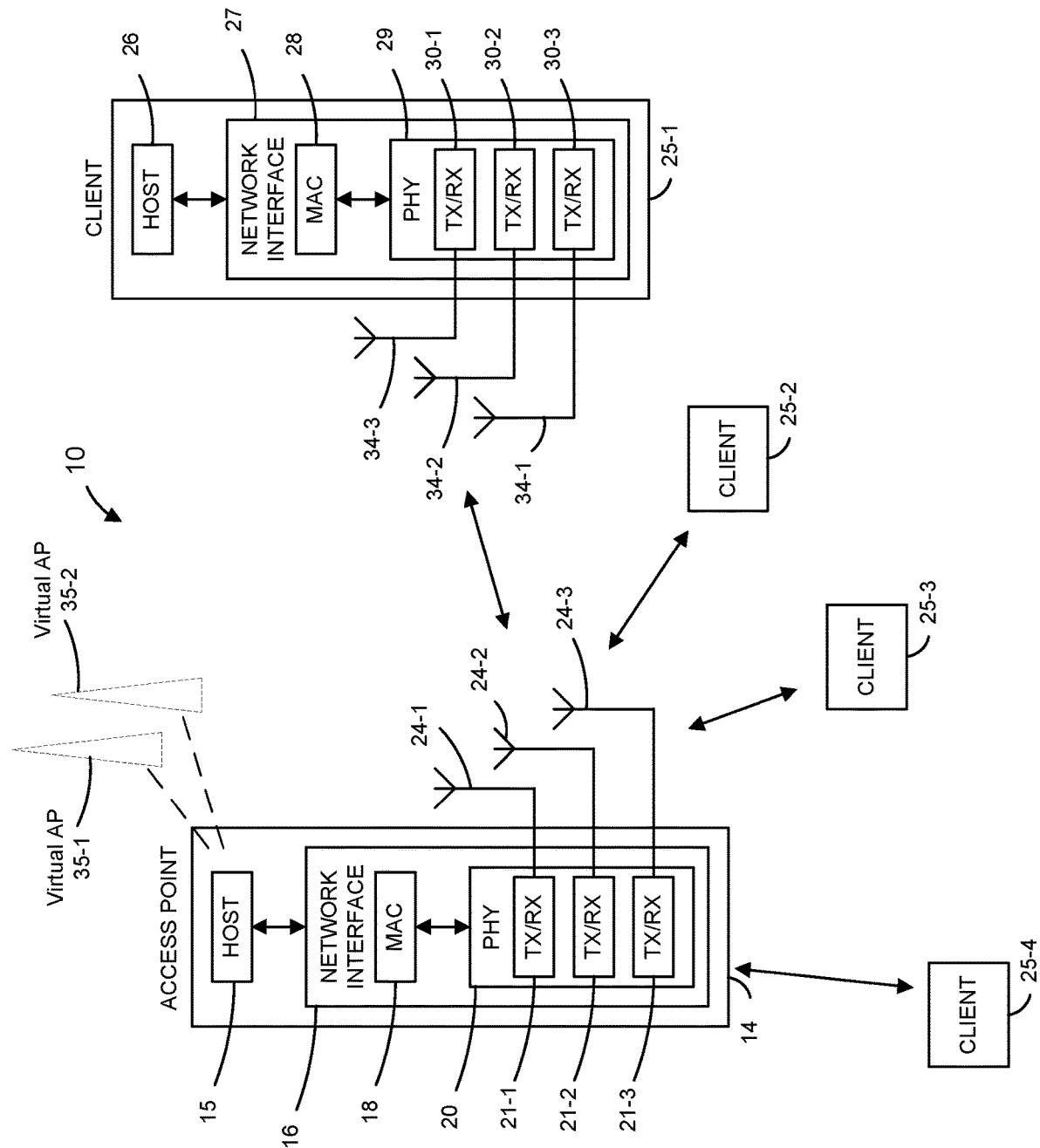
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface device 16. The network interface device 16 includes a medium access control (MAC) processing unit 18 and PHY processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments.

In various embodiments, the network interface device 16 is implemented on one or more integrated circuit (IC) devices. For example, in an embodiment, at least a portion of the MAC processing unit 18 is implemented on a first IC device and at least a portion of the PHY processing unit 20 is implemented on a second IC device. As another example, at least a portion of the MAC processing unit 18 and at least a portion of the PHY processing unit 20 are implemented on a single IC device.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments.

A client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In various embodiments, the network interface device 27 is implemented on one or more IC devices. For example, in an embodiment, at least a portion of the MAC processing unit 28 is implemented on a first IC device and at least a portion of the PHY processing unit 29 is implemented on a second IC device. As another example, at least a portion of the MAC processing unit 28 and at least a portion of the PHY processing unit 29 are implemented on a single IC device.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the AP is configured to operate according to a wireless communication protocol that utilizes Orthogonal Frequency Multiple Division Access (OFDMA) technology and/or multi-user multiple input, multiple output (MU-MIMO) technology. The wireless communication protocol is sometimes referred to herein as the IEEE 802.11ax Standard, the high efficiency WiFi protocol, the HEW protocol, the HE protocol, or 802.11 HE.

In an embodiment, the AP 14 (e.g., the network interface device 16 of the AP 14) is configured to transmit independent data simultaneously to multiple client stations 25 via different spatial streams (e.g., downlink (DL) MU-MIMO) and/or via different OFDM sub-channels (e.g., DL OFDMA). In an embodiment, the AP 14 (e.g., the network interface device 16 of the AP 14) is configured to receive independent data simultaneously from multiple client stations 25 via different spatial streams (e.g., uplink (UL) MU-MIMO) and/or via different OFDM sub-channels (e.g., UL OFDMA). In some embodiments, two or more of the client stations 25 are configured to receive respective data streams that are transmitted simultaneously by the AP 14 (e.g., DL OFDMA and/or DL MU-MIMO). For example, in one embodiment, the network interface device 27 is configured to receive a data stream among a plurality of independent data streams transmitted simultaneously by the AP 14 to multiple client stations 25 via different spatial streams and/or via different OFDM sub-channels. In other embodiments, two or more of the client stations 25 additionally or alternatively are configured to transmit corresponding data streams to the AP 14 such that the AP 14 receives the data streams simultaneously (e.g., UL OFDMA and/or UL MU-MIMO). For example, in one embodiment, the network interface device 27 is configured to transmit a data stream while one or more other client devices 25 transmit one or more other independent data streams simultaneously to the AP 14 via different spatial streams and/or via different OFDM sub-channels.

In an embodiment, the AP 14 and the client stations 25 contend for communication medium using carrier sense multiple access with collision avoidance (CSMA/CA) protocol or another suitable medium access protocol. In an embodiment, the AP 14 and the client stations employ a clear channel assessment (CCA) procedure, in which the AP/client station determines the energy level of the medium in order to determine whether the medium is busy or idle. If the medium is idle, the device can transmit. If the medium is busy, the device waits a backoff period and then checks the medium again after the backoff period. A threshold energy level for determining whether the medium is idle or busy may depend upon the bandwidth of the channel being used by the device and on whether the energy corresponds to a transmission that conforms to the wireless communication protocol. For example, in 802.11, if the channel bandwidth is 20 Megahertz (MHz), the threshold level is −82 decibel-milliwatts (dBm) for energy from valid 802.11 transmissions. For channel bandwidths of 40 MHz, 80 MHz, and 160 MHz, the threshold levels are −79 dBm, −76 dBm, and −73 dBm, respectively. For energy not identified by the device as a valid 802.11 signal, the threshold level is −62 dBm.

In an embodiment, the AP 14 and the client stations 25 employ a dynamic CCA procedure. In the dynamic CCA procedure, the AP/client device may use a higher threshold level for valid 802.11 signals from a different BSS as compared to the threshold level for valid 802.11 signals from the same BSS. For example, an AP/client device might deem a 20 MHz channel to be idle if the energy level of an 802.11 signal from another BSS is less than −62 dBm (i.e., the same threshold level as for energy corresponding to signals that are not valid 802.11 signals), but deem the channel to be busy if the energy level of an 802.11 signal from the same BSS is greater than −82 dBm. Thus, an energy level of −70 dBm of a valid 802.11 signal from a different BSS would result in the device determining that the channel is idle, while an energy level of −70 dBm resulting from same-BSS signals would result in the device determining that the channel is busy. Allowing a higher CCA level for transmissions corresponding to another BSS helps to promote spatial reuse between different BSSs, at least in some embodiments and/or scenarios. In some embodiments, the AP 14 and/or the client stations 25 are able to effectively override dynamic CCA when they determine that an energy level is based on transmissions to or from the same physical AP (although different virtual APs).

Further, in an embodiment, the AP 14 or a client station 25 dynamically selects a bandwidth for a transmission based on channels available for the transmission. In some embodiments, communication between the AP 14 and the client stations 25 can occur in a primary channel of the WLAN 10, in both a primary and a secondary channel of the WLAN 10, exclusively on a secondary channel of the WLAN 10, etc.

In an embodiment, the AP 14 is configured to transmit different independent data to different client stations 25 simultaneously by generating an OFDMA data unit that includes different independent data modulated in respective sub-channels of a communication channel. In an embodiment, each sub-channel incudes one or more sub-channel blocks, each sub-channel block corresponding to a set of sub-carriers within the OFDMA data unit. In an embodiment, the AP 14 allocates different sub-channels to different client stations and generates the OFDMA data unit that respective data is modulated in sub-channel blocks corresponding to the sub-channels allocated to the client stations. The AP may assign the primary and the non-primary communication channels in any suitable manner to the one or more client stations, in various embodiments.

In an embodiment, the AP 14 (e.g., the host processor 15 and/or the network interface device 16 (e.g., the MAC processor device 18)) sets up a plurality of virtual APs, represented in FIG. 1 by a first virtual AP 35-1 and a second virtual AP 35-2. Each virtual AP uses the resources of the AP 14 to provide a BSS to the WLAN 10, effectively appearing to the clients 25 as multiple WLANs. To distinguish between the AP 14 and the virtual APs 35-1 and 35-2, the AP 14 will sometimes be referred to herein as a "physical AP." Each virtual AP 35 corresponds to a respective Basic Service Set Identification (BSSID). In an embodiment, the physical AP 14 (e.g., one of the virtual APs) broadcasts a beacon that advertises the BSSIDs of the virtual APs 35. In an embodiment, the BSSIDs are contained in a multiple BSSID information element of the beacon. FIG. 2 is a diagram of an example multiple BSSID information element 200, according to an embodiment. The BSSIDs are included in the field 220, in an embodiment.

Referring again to FIG. 1, the virtual APs 35 may utilize a single beacon and may broadcast, via the single beacon, one or more properties, parameter values, etc., shared by the virtual APs, according to various embodiments. For example, in an embodiment, the following information elements in a beacon are common for all of the virtual APs 35 (e.g., each information element provides information that is same for the virtual APs): a Timestamp, a Beacon Interval, a Direct Sequence Spread Spectrum (DSSS) Parameter Set, a Frequency Hopping (FH) Parameter Set, an Independent BSS (IBSS) Parameter Set, a Country, FH Parameters, a FH Pattern Table, a Channel Switch Assignment, an Extended Channel Switch Announcement, Supported Operating Classes, an IBSS Dynamic Frequency Selection (DFS), Extended Rate Physical (ERP) Information, High Throughput (HT) Capabilities, HT Operation elements, etc. Because these elements are common amongst the virtual APs, in an embodiment, the physical AP 14 does not include these elements in the Nontransmitted BSSID Profile field 220 (FIG. 2). In an embodiment, the values of these elements for each nontransmitted BSSID are always the same as the corresponding transmitted BSSID element values. In an embodiment, the first $2^n$ bits of the Traffic Indication Map (TIM) are reserved for broadcast/multicast for each BSS, where n is a suitable positive integer. In an embodiment, the value of n is reported in the multiple BSSID element. In an embodiment, the remainder of the Association ID (AID) space is shared by all BSSs. Furthermore, in an embodiment, each BSS (e.g., each virtual AP) has a respective Delivery Traffic Indication Message (DTIM) interval that need not be the same as the other BSSs.

In some embodiments, multiple A-MPDUs to/from multiple STAs are included in a single MU transmission. In some embodiments, an A-MPDU in a single MU transmission includes MPDUs to/from multiple STAs. In some embodiments, at most one A-MPDU can be included in a single SU transmission.

Figure 3:
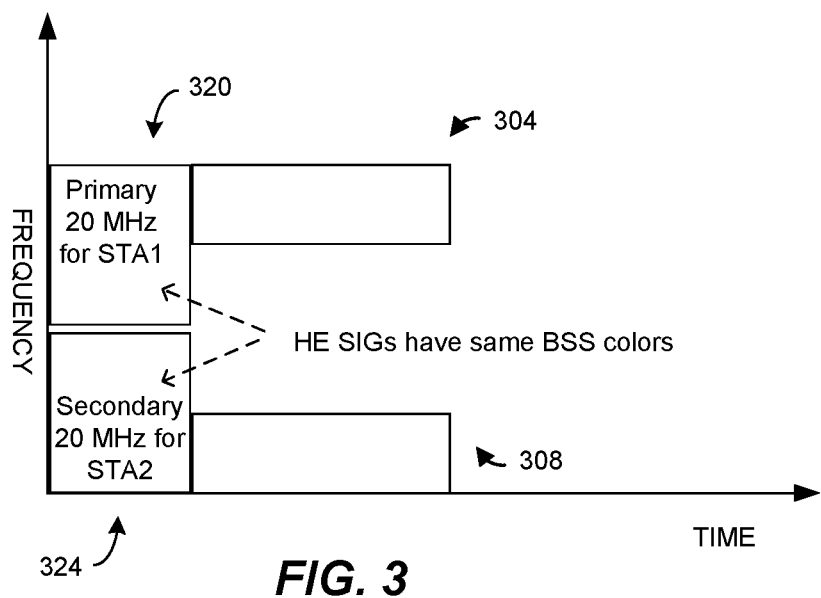
FIG. 3 is a diagram of two High Efficiency (HE) PPDUs transmitted by different virtual APs, according to an embodiment.

FIG. 3 is a diagram of an example orthogonal frequency division multiplexing (OFDM) multi-user (MU) transmission corresponding to two PPDUs (e.g., 802.11 HE PPDUs) simultaneously transmitted by a physical AP, where each PPDU corresponds to a different virtual AP having a same BSS color value, according to an embodiment. In the scenario illustrated in FIG. 3, a first PPDU 304 is transmitted to a first client device (STA1) via a 20 MHz primary channel of a first BSS served by a first virtual AP; and a second PPDU 308 is transmitted to a second client device (STA2) via a 20 MHz secondary channel of a second BSS served by a second virtual AP. In an embodiment, the first BSS and the second BSS have the same 20 MHz primary channel.

The first PPDU 304 includes a first PHY preamble 320 having a first HE signal (SIG) field (HE SIG), and the second PPDU 308 includes a second PHY preamble 324 having a second SIG field (HE SIG). In the scenario illustrated in FIG. 3, the first virtual AP has been assigned a first identifier (referred to herein as a "color"), and the second virtual AP has been assigned the same first identifier (or color). In some embodiments, the color is not globally unique. In some embodiments, a range of possible colors is smaller than a range of possible BSSIDs, and thus each color can be represented by less bits than a BSSID. In an embodiment, each HE SIG field includes a color field to indicate the color of the BSS to which the PPDU corresponds. Thus, in an embodiment, the color field in the first HE SIG field in the preamble 320 has a value corresponding to the first identifier (color), and the color field in the second HE SIG field in the preamble 324 has a value corresponding to the same first identifier (color).

When different virtual APs have different BSS colors, A-MPDUs transmitted to STAs which are associated with different virtual APs cannot be in one DL MU transmission, and A-MPDUs transmitted from STAs which are associated with different virtual APs cannot be in one UL MU transmission. For instance, in some embodiments, HE SIG fields of MU transmissions use a whole MU transmission bandwidth, e.g. in a 40 MHz MU transmission, HE SIGs from different virtual APs occupy the same 40 MHz bandwidth.

On the other hand, an HE SIG of a SU PPDU includes the BSS color of the virtual AP that is the transmitter or the receiver of the SU PPDU. When different virtual APs have different BSS colors, the HE SIGs of SU PPDUs transmitted by different virtual APs have different BSS colors, and the BSS color of SU PPDUs transmitted to different virtual APs have different BSS colors. When the second virtual AP transmits a SU HE PPDU to an associated STA, the HE SIG of the SU HE PPDU includes the BSS color of the second virtual AP. Consequently, devices associated with the first virtual AP may utilize a CCA energy threshold corresponding to an "other BSS" with transmissions from the second virtual AP, and vice versa, even though the transmissions are from the same physical AP.

Figure 4:
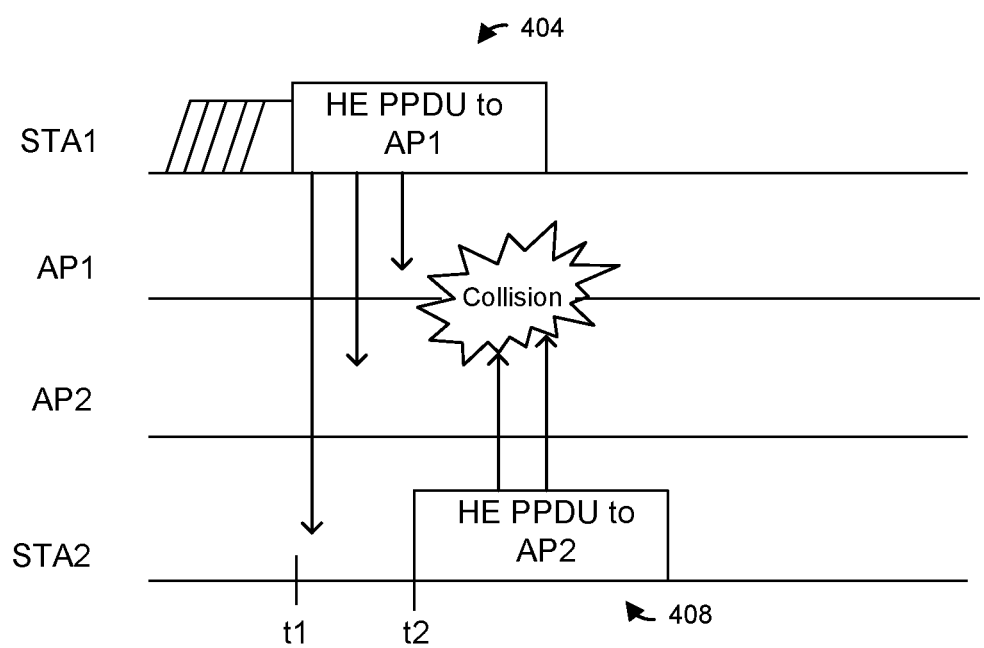
FIG. 4 is a message sequence diagram illustrating transmissions by multiple client device associated with different virtual APs, according to an embodiment.

FIG. 4 is a message sequence diagram of multiple transmissions among STA1, STA2, a first virtual AP (AP1) and a second virtual AP (AP2). In this example, STA1 is associated with AP1, whose BSS color will be referred to as Color 1, and STA2 is associated with AP2, whose BSS color will be referred to as Color 2, which is different than Color 1. At time t1, STA1 begins transmitting an HE PPDU 404 to AP1. STA2 has its own HE PPDU that STA2 needs to transmit to AP2. STA2 therefore carries out a CCA procedure to determine whether the channel is clear. In carrying out the CCA procedure, STA2 detects and decodes the HE SIG of HE PPDU 404, identifies the BSS color associated with HE PPDU 404 as Color 1, and, because Color 1 is different than the color of AP2 with which STA2 is associated, STA2 uses the dynamic CCA level (i.e., allows for a higher level of 802.11-based energy than a standard CCA level associated with 802.11 transmissions in a same BSS). Using the dynamic CCA level, STA2 concludes that the channel is clear and, at time t2, begins transmitting an HE PPDU 408 to AP2. However, because AP1 and AP2 exist are implemented by a same physical AP, a collision occurs.

FIGS. 5A-5C are diagrams of example channel allocation schemes in an 80 MHz communication channel, according to various embodiments. In each of FIGS. 5A-5C, respective 20 MHz sub-channels are allocated to each of four client stations 25 (STA1, STA2, STA3 and STA4). In FIG. 5A, each of the sub-channels, allocated to a particular one of STA1, STA2, STA3 and STA4, includes of a single sub-channel block of adjacent sub-carriers allocated to the particular station. In FIG. 5B, each of the sub-channels, allocated to a particular one of STA1, STA2, STA3 and STA4, includes four respective sub-channel blocks uniformly spaced over the entire 80 MHz channel. In FIG. 5C, each of the sub-channels includes of four respective non-uniformly (e.g., randomly) spaced over the entire 80 MHz channel. In each of FIGS. 5B and 5C, each of the sub-channel blocks allocated to a particular client station includes a block of adjacent sub-carriers, wherein the block of adjacent sub-carriers includes a subset of sub-carriers, of the 80 MHz channel, allocated to the particular client station, according to an embodiment.

In some embodiments, a sub-channel having a suitable bandwidth less than the smallest bandwidth of the WLAN can be allocated to a client station. For example, in some embodiments in which the smallest channel bandwidth of the WLAN 10 is 20 MHz, sub-channel having bandwidth less than 20 MHz, such as sub-channels having bandwidths of 10 MHz and/or 5 MHz can be allocated to client stations, in at least some scenarios.

Figure 6A:
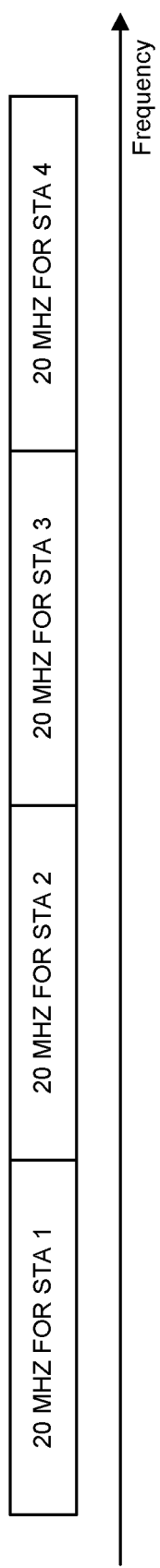
Figure 6B:
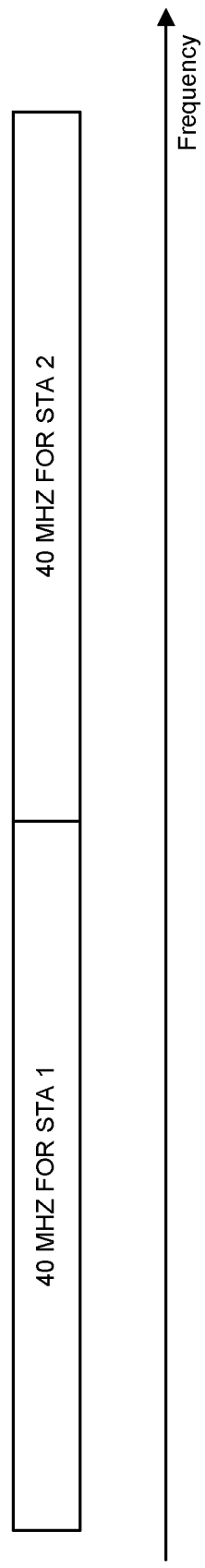

FIGS. 6A, 6B, 6C, and 6D are diagrams illustrating example OFDM sub-channels of an 80 MHz communication channel, according to various embodiments. In FIG. 6A, the communication channel is partitioned into four contiguous sub-channels, each having a bandwidth of 20 MHz. The OFDM sub-channels include independent data streams for four client stations. In FIG. 6B, the communication channel is partitioned into two contiguous sub-channel channels, each having a bandwidth of 40 MHz. The OFDM sub-channels include independent data streams for two client stations. In FIG. 6C, the communication channel is partitioned into three contiguous OFDM sub-channels. Two OFDM sub-channels each have a bandwidth of 20 MHz. The remaining OFDM sub-channel has a bandwidth of 40 MHz. The OFDM sub-channels include independent data streams for three client stations. In FIG. 6D, the communication channel is partitioned into four contiguous OFDM sub-channels. Two OFDM sub-channels each have a bandwidth of 10 MHz, one OFDM sub-channel has a bandwidth of 20 MHz, and one OFDM sub-channel has a bandwidth of 40 MHz. The OFDM sub-channels include independent data streams for three client stations.

Although in FIGS. 6A, 6B, 6C, and 6D the OFDM sub-channels are contiguous across the communication channel, in other embodiments the OFDM sub-channels are not contiguous across the communication channel (i.e., there are one or more gaps between the OFDM sub-channels). In an embodiment, each gap is at least as wide as one of the OFDM sub-channel blocks. In another embodiment, at least one gap is less than the bandwidth of an OFDM sub-channel block. In another embodiment, at least one gap is at least as wide as 1 MHz. In one embodiment, the AP includes a plurality of radios and different OFDM sub-channel blocks are transmitted using different radios.

In FIGS. 6A, 6B, 6C, and 6D, each sub-channel corresponds to a single sub-channel block of adjacent sub-carriers allocated to a particular client station. In other embodiments, each of at least some sub-channels of an 80 MHz channel corresponds to several sub-channel blocks, each having adjacent sub-carriers, where the several sub-channel blocks collectively comprise the sub-carriers allocated to a particular client station. The several sub-channel blocks corresponding to a particular client station are uniformly or non-uniformly distributed over the 80 MHz channel, for example as described above with respect to FIGS. 6B and 6C, in some embodiments. In such embodiments, an independent data stream for the particular client station is accordingly distributed over the 80 MHz channel.

Figure 7:
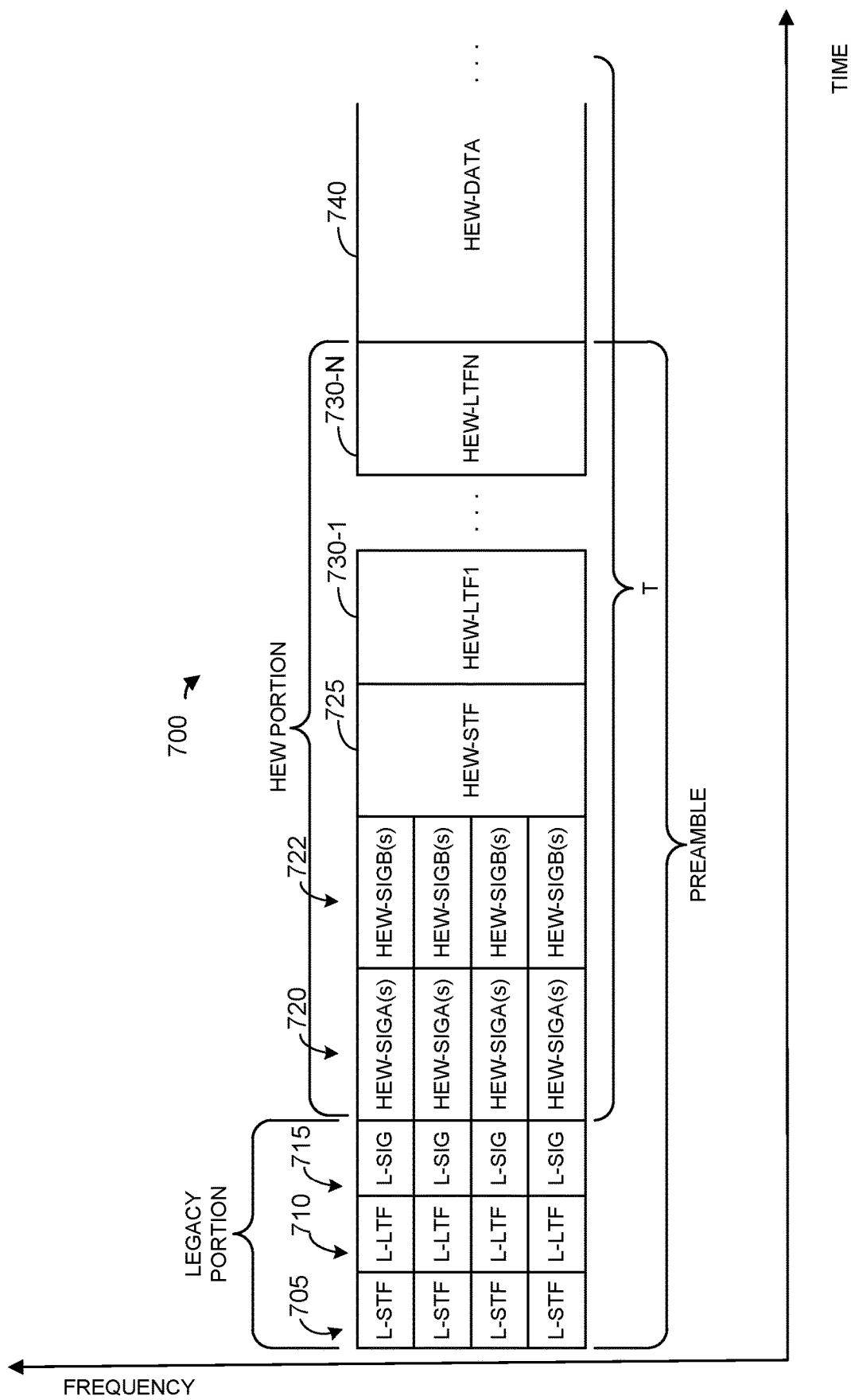
FIG. 7 is a diagram of an example PHY data unit, according to an embodiment.

FIG. 7 is a diagram of an OFDM data unit 700, according to an embodiment. In some embodiments, an AP (e.g., the AP 14) is configured to generate and transmit OFDM data units having a format such as illustrated in FIG. 7 to client devices (e.g., client devices 25), and/or a client station (e.g., the client station 25-1) is configured to transmit the data unit 700 to the AP (e.g., the AP 14). The data unit 700 conforms to the HEW protocol and occupies an 80 MHz band. In other embodiments, data units similar to the data unit 700 occupy different suitable bandwidths such as 20 MHz, 40 MHz, 120 MHz, 160 MHz, or any suitable bandwidth. The data unit 700 is suitable for "mixed mode" situations, such as when a WLAN 10 includes a client station that conforms to a legacy protocol, but not the HEW protocol. The data unit 700 can be utilized in other situations as well.

The data unit 700 includes a PHY preamble having four legacy short training fields (L-STFs) 705; four legacy long training fields (L-LTFs) 710; four legacy signal fields (L-SIGs) 715; four first high efficiency WLAN signal fields (HEW-SIGAs) 720; four second high efficiency WLAN signal fields (HEW-SIGBs) 722; a high efficiency WLAN short training field (HEW-STF) 725; and N high efficiency WLAN long training fields (HEW-LTFs) 730, where N is an integer. The data unit 700 also includes a high efficiency WLAN data portion (HEW-DATA) 740. The L-STFs 705, the L-LTFs 710, and the L-SIGs 715 form a legacy portion of the PHY preamble. The HEW-SIGA 720, the HEW HEW-SIGBs 722; the HEW-STF 725, and the HEW-LTFs 730 form a high efficiency WLAN (HEW) portion of the PHY preamble. In an embodiment, a color field is included in the HEW-SIGAs 720. In another embodiment, the color field is included in the HEW-SIGB s 722. In an embodiment, each STA transmits its PHY SIG only in 20 MHz channels that overlap with the subchannel in which the STA is transmitting. In another embodiment, each STA transmit its PHY SIG in all 20 MHz channels of the MU transmission, and, in an embodiment, the content of the PHY SIGs by multiple STAs in each 20 MHz channel is the same. In an embodiment, the PHY SIGs by multiple STAs are made to have the same content so that other stations can properly decode the content of the PHY SIG. For instance, if the content of different PHY SIGs was different (e.g., different color values), this may garble the content of the PHY SIGs when received by other communication devices, at least in some embodiments and/or scenarios.

Each of the L-STFs 705, each of the L-LTFs 710, each of the L-SIGs 715, each of the HEW-SIGAs 720, and each of the HEW-SIGBs 722 occupy a 20 MHz band, in one embodiment. The data unit 700 is described as having an 80 MHz contiguous bandwidth for the purposes of illustrating an example frame format, but such frame format is applicable to other suitable bandwidths (including noncontiguous bandwidths). For instance, although the preamble of the data unit 700 includes four of each of the L-STFs 705, the L-LTFs 710, the L-SIGs 715, the HEW-SIGAs 720, and the HEW-SIGBs 722 in other embodiments in which an OFDM data unit occupies a cumulative bandwidth other than 80 MHz, such as 20 MHz, 40 MHz, 120 MHz, 160 MHz, etc., a different suitable number of the L-STFs 705, the L-LTFs 710, the L-SIGs 715, the HEW-SIGAs 720, and the HEW-SIGBs 722 are utilized accordingly. For example, for an OFDM data unit occupying a 20 MHz cumulative bandwidth, the data unit includes one of each of the L-STFs 705, the L-LTFs 710, the L-SIGs 715, the HEW-SIGAs 720, and the HEW-SIGBs 722; a 40 MHz bandwidth OFDM data unit includes two of each of the fields 705, 710, 715, 720, and 722; a 120 MHz bandwidth OFDM data unit includes six of each of the fields 705, 710, 715, 720, and 722; a 160 MHz bandwidth OFDM data unit includes eight of each of the fields 705, 710, 715, 720, and 722, and so on, according to some embodiments.

In the example data unit 700, each of the HEW-STF 725, the HEW-LTFs 730, and the HEW-DATA 740 occupy the entire 80 MHz cumulative bandwidth of the data unit 700. Similarly, in the case of an OFDM data unit conforming to the HEW protocol and occupying a cumulative bandwidth such as 20 MHz, 40 MHz, 120 MHz, or 160 MHz, each of the HEW-STF 725, the HEW-LTFs 730, and the HEW-DATA 740 occupy the corresponding entire cumulative bandwidth of the data unit, in some embodiments.

In some embodiments, the 80 MHz band of the data unit 700 is not contiguous, but includes two or more smaller bands, such as two 40 MHz bands, separated in frequency. Similarly, for other OFDM data units having different cumulative bandwidths, such as a 160 MHz cumulative bandwidth, in some embodiments the band is not contiguous in frequency. Thus, for example, the L-STFs 705, the L-LTFs 710, the L-SIGs 715, the HEW-SIGAs 720, and the HEW-SIGBs 722 occupy two or more bands that are separated from each other in frequency, and adjacent bands are separated in frequency by at least one MHz, at least five MHz, at least 10 MHz, at least 20 MHz, for example, in some embodiments.

According to an embodiment, each of the L-STFs 705 and each of the L-LTFs 710 have a format as specified in a legacy protocol such as the IEEE 802.11a Standard, the IEEE 802.11n Standard, and/or the IEEE 802.11ac Standard. In an embodiment, each of the L-SIGs 715 has a format at least substantially as specified in legacy protocol (e.g., the IEEE 802.11a Standard, the IEEE 802.11n Standard, and/or the IEEE 802.11ac Standard). In such embodiments, the length and rate subfields in the L-SIGs 715 is set to indicate a duration T corresponding to the remainder of the data unit 700 after the legacy portion. This permits client stations that are not configured according to the HEW protocol to determine an end of the data unit 700 for carrier sense multiple access/collision avoidance (CSMA/CA) purposes, for example. For example, legacy client stations determine the duration of the remainder of the data unit 700 and refrain from accessing the medium (or at least transmitting in the medium) for the duration of the remainder of the data unit 700, in an embodiment. In other embodiments, each of the L-SIGs 715 has a format at least substantially as specified in legacy protocol (e.g., the IEEE 802.11a Standard, the IEEE 802.11n Standard, and/or the IEEE 802.11ac Standard) but with length field in the L-SIGs 715 set to indicate a duration of the time remaining in a transmission opportunity during which the data unit 700 is transmitted. In such embodiments, client stations that are not configured according to the HEW protocol determine an end of the TXOP and refrain from accessing the medium (or at least transmitting in the medium) for the duration of the TXOP, in an embodiment.

In the data unit 700, frequency domain symbols of the legacy portion are repeated over four 20 MHz subbands of the 80 MHz band. Legacy client stations that are configured to operate with 20 MHz bandwidth will recognize a legacy preamble in any of the 20 MHz subbands. In some embodiments, the modulations of the different 20 MHz subband signals are rotated by different suitable angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment.

In some embodiments, the modulations of the HEW-SIGAs 720 in the different 20 MHz subbands is rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment. In an embodiment, the same rotations utilized in the legacy portion are utilized for the HEW-SIGAs 720. In some embodiments, the modulations of the HEW-SIGB s 722 in the different 20 MHz subbands are similarly rotated by different angles. In at least some examples, the HEW-SIGAs 720 are collectively referred to as a single high efficiency WLAN signal field (HEW-SIGA) 720. In at least some examples, the HEW-SIGBs 722 are collectively referred to as a single high efficiency WLAN signal field (HEW-SIGB) 722.

In an embodiment, the data unit 700 is a single user data unit that includes data for only a single AP or only a single client device 25. In another embodiment, the data unit 700 is a multi-user data unit that includes independent data streams for multiple client stations 25 over respective spatial streams. In an embodiment in which the data unit 700 is a multi-user data unit, a portion of the data unit 700 (e.g., the L-STFs 705, the L-LTFs 710, the L-SIGs 715, the HEW-SIGAs 720, and the HEW-SIGBs 722) is unsteered or omnidirectional (or "omnidirectional" or "pseudo-omnidirectional"; the terms "unsteered" and "omnidirectional" as used herein are intended to also encompass the term "pseudo-omnidirectional") and includes data that is common to all intended recipients of the data unit 700. The data unit 700 further includes a second portion (e.g., the HEW-STF 725, the HEW-LTFs 730, and the HEW-DATA portion 740) in which beamforming is applied to different spatial streams to shape, or beamform, transmission over the corresponding spatial streams to particular client stations 25. In some such embodiments, the steered portion of the data unit 700 includes different (e.g., "user-specific") content transmitted over different spatial streams to different ones of the client stations 25.

In some embodiments, the AP 14 is configured to transmit respective OFDM data units, such as the OFDM data unit 700, simultaneously to multiple client stations 25 as parts of a downlink OFDMA transmission from the AP 14 to the multiple client stations 25. In an embodiment, the AP 14 transmits the respective OFDM data units in respective sub-channels allocated to the client stations. Similarly, in an embodiment, multiple client stations 25 transmit respective OFDM data units, such as the OFDM data unit 700, simultaneously to the AP 14 as parts of an uplink OFDMA transmission from the multiple client stations 25 to the AP 14. In an embodiment, the client stations 25 transmit the respective OFDM data units in respective sub-channels allocated to the client stations 25. In an embodiment, a sub-channel allocated to a particular client station corresponds to a single sub-channel block of adjacent sub-carriers of the communication channel (e.g., as illustrated in FIG. 5A). In an embodiment, a sub-channel allocated to a particular client station includes several sub-channel blocks of adjacent sub-carriers, each sub-channel block having a set of sub-carriers allocated to the particular client station. In an embodiment, the several sub-channel blocks corresponding to a particular client station are uniformly distributed over the communication channel (e.g., as illustrated in FIG. 5B). In another embodiment, the several sub-channel blocks are not necessarily uniformly distributed over the communication channel. For example, the several sub-channel blocks are randomly distributed over the communication channel (e.g., as illustrated in FIG. 5C), or are distributed according to another suitable distribution scheme over the communication channel, in some embodiments.

In some embodiments, the uplink data units (e.g., transmitted from a client device to an AP) omit HEW-SIGBs. For instance, in some embodiments, the AP instructs client devices regarding which parameters (e.g., MCS, number of spatial streams, etc.) to use when transmitting to the AP, and thus such parameters need not be included in the PHY preamble of uplink data units. Thus, this allows omission of the HEW-SIGBs from uplink data units.

In some embodiments, single user (SU) data units omit HEW-SIGBs. For instance, in some embodiments, some parameters in the HEW-SIGB relate to multi-user transmissions, and other parameters (e.g., MCS, number of spatial streams, etc.) in the HEW-SIGB can be included in the HEW-SIGA. Thus, this allows omission of the HEW-SIGBs from SU data units.

In some embodiments, the HEW-SIGB(s) are positioned after the HEW-LTFs 730. In such embodiments, the HEW-SIGB(s) occupy the entire cumulative bandwidth of the data unit 700. For example, in the case of an OFDM data unit conforming to the HEW protocol and occupying a cumulative bandwidth such as 20 MHz, 40 MHz, 120 MHz, or 160 MHz, the HEW-SIGB(s) the corresponding entire cumulative bandwidth of the data unit, in some embodiments. In such embodiments, beamforming is applied to different spatial streams to shape, or beamform, HEW-SIGBs over the corresponding spatial streams to particular client stations 25.

In some embodiments, further signal (SIG) fields are included in the PHY preamble and positioned after the HEW-LTFs 730. In such embodiments, beamforming is applied to different spatial streams to shape, or beamform, the further SIG fields over the corresponding spatial streams to particular client stations 25.

Figure 8:
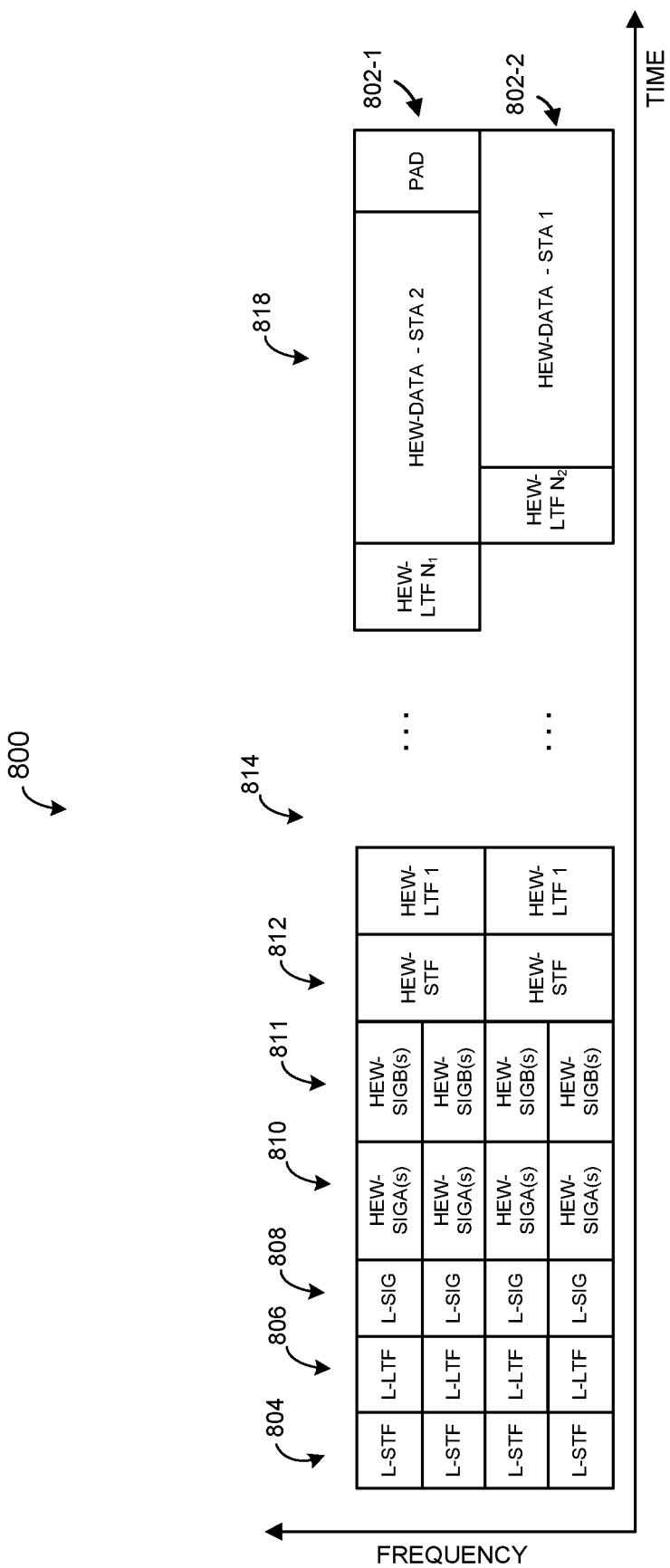
FIG. 8 is a diagram of an example multi-user PHY data unit, according to an embodiment.

FIG. 8 is a diagram of an example OFDMA data unit 800, according to an embodiment. The OFDMA data unit 800 includes a plurality of OFDM data units 802. Respective ones of the data units 802 include independent data streams transmitted to, or received from, respective ones of two client devices 25. In an embodiment, each OFDM data unit 802 is the same as or similar to the OFDM data unit 700 of FIG. 7. In an embodiment, the AP 14 transmits the OFDM data units 802 to different client stations 25 via respective OFDM sub-channels within a composite channel spanned by the OFDMA data unit 800. In another embodiment, different client stations 25 transmit respective OFDM data units 802 to the AP 14 in respective OFDM sub-channels within the composite channel spanned by the OFDMA data unit 800. In such an embodiment, the AP 14 receives the OFDM data units 802 from the client stations 25 via respective OFDM sub-channels of within the composite channel spanned by the OFDMA data unit 800. Although the data unit 800 is illustrated in FIG. 8 as including only two data units 802 transmitted to, or received from, only two client stations 25, the data unit 800 includes more than two (e.g., 3, 4, 5, 6, etc.) data units 802 transmitted to, or received from, more than two (e.g., 3, 4, 5, 6, etc.) client stations 25, in other embodiments.

Each of the OFDM data units 802 conforms to a communication protocol that defines OFDMA communication, such as the HEW communication protocol, in an embodiment. In an embodiment in which the OFDMA data unit 800 corresponds to a downlink (DL) OFDMA data unit, the OFDMA data unit 800 is generated by the AP 14 such that each OFDM data unit 802 is transmitted to a respective client station 25 via a respective sub-channel allocated for downlink transmission of the OFDMA data unit 800 to the client station. Similarly, an embodiment in which the OFDMA data unit 800 corresponds to an uplink (UL) OFDMA data unit, the AP 14 receives the OFDM data units 802 via respective sub-channels allocated for uplink transmission of the OFDM data units 802 from the client stations, in an embodiment. For example, the OFDM data unit 802-1 is transmitted via a first 40 MHz sub-channel, and the OFDM data unit 802-2 is transmitted via a second 40 MHz sub-channel, in an embodiment.

In an embodiment, each of the OFDM data units 802 includes a preamble including one or more L-STFs 804, one or more L-LTFs 806, one or more L-SIGs 808, one or more HEW-SIG-As 810, N HEW-LTFs, and a HEW-SIGB 814. Additionally, each OFDM data unit 802 includes a HEW-DATA portion 818. In an embodiment, each L-STF field 804, each L-LTF field 806, each L-SIG field 808, each HEW-SIGA field 810, and each HEW-SIGB field 811 occupies a smallest channel bandwidth supported by the WLAN 10 (e.g., 20 MHz). In an embodiment, if an OFDM data unit 802 occupies a bandwidth that is greater than the smallest channel bandwidth of the WLAN 10, then each L-STF field 804, each L-LTF field 806, each L-SIG field 808, each HEW-SIGA field 810, and each HEW-SIGB field 811 is duplicated in each smallest channel bandwidth portion of the OFDM data unit 802 (e.g., in each 20 MHz portion of the data unit 802). On the other hand, each HEW-STF field 812, each HEW-LTF field 814, and each HEW data portion 818 occupies an entire bandwidth of the corresponding OFDM data unit 802, in an embodiment.

In an embodiment, padding is used in one or more of the OFDM data units 802 to equalize lengths of the OFDM data units 802. Accordingly, the length of each of the OFDM data units 802 correspond to the length of the OFDMA data unit 802, in this embodiment. Ensuring that the OFDM data units 802 are of equal lengths facilitates synchronizing transmission of acknowledgment frames by client stations 25 that receive the data units 802, in an embodiment. In an embodiment, each of one or more of the OFDM data units 802 includes an aggregate MAC protocol data unit (A-MPDU) that includes multiple aggregated MAC protocol data units (MPDUs), which is in turn included in a PHY protocol data unit (PPDU). In another embodiment, each of one or more of the OFDM data units 802 includes a single MPDU, which is in turn included in a PPDU. In an embodiment, padding (e.g., zero-padding) within one or more of the A-MPDUs 802 or single MPDUs 802 is used to equalize the lengths of the data units 802.

In an embodiment, the AP 14 forms groups of client stations 25 for simultaneous downlink transmissions to client stations 25 and/or simultaneous uplink transmissions by client stations 25. To this end, the AP 14 allocates respective sub-channels to client stations 25 within a group of client stations 25 and/or allocates respective spatial streams to client stations 25, in embodiments. In an embodiment and/or scenario, the AP 14 then transmits one or more OFDMA data units to the client stations 25 in a group using the respective sub-channels allocated to the client stations 25 within the group and/or transmits one or more MU MIMO data units to client stations 25 in a group using respective spatial streams allocated to the client stations 25 within the group. Each group of client stations 25 includes two or more client stations 25, in an embodiment. In an embodiment, the AP 14 dynamically groups client stations to one MU transmission without group management. In an embodiment, the AP 14 notifies the groups that a station belongs to a group through a management frame exchange. A particular client station 25 belongs to one or more groups of the client stations 25, in an embodiment. Thus, for example, a first group of client stations 25 includes the client station 25-1 and the client station 25-2, and a second group of client stations 25 includes the client station 25-1 and the client stations 25-3, in an example embodiment and/or scenario. Accordingly, the client station 25-1 belongs to the first group of client stations 25 and to the second group of client stations 25, in this example embodiment and/or scenario.

In an embodiment, a color field is included in the HEW-SIGAs 810. In another embodiment, the color field is included in the HEW-SIGBs 811.

In some embodiments, the uplink (UL) OFDMA data units (e.g., transmitted from a client device to an AP) omit HEW-SIGBs. For instance, in some embodiments, the AP instructs client devices regarding which parameters (e.g., MCS, number of spatial streams, etc.) to use when transmitting to the AP, and thus such parameters need not be included in the PHY preamble of uplink data units. Thus, this allows omission of the HEW-SIGBs from UL OFDMA data units.

In some embodiments, the HEW-SIGBs are positioned after the HEW-LTFs 814. In such embodiments, each HEW-SIGB 811 occupies an entire bandwidth of the corresponding OFDM data unit 802. In such embodiments, beamforming is applied to different spatial streams to shape, or beamform, HEW-SIGBs 811 over the corresponding spatial streams to particular client stations 25.

In some embodiments, further signal (SIG) fields are included in the PHY preamble and positioned after the HEW-LTFs 730. In such embodiments, beamforming is applied to different spatial streams to shape, or beamform, the further SIG fields over the corresponding spatial streams to particular client stations 25.

Figure 9:
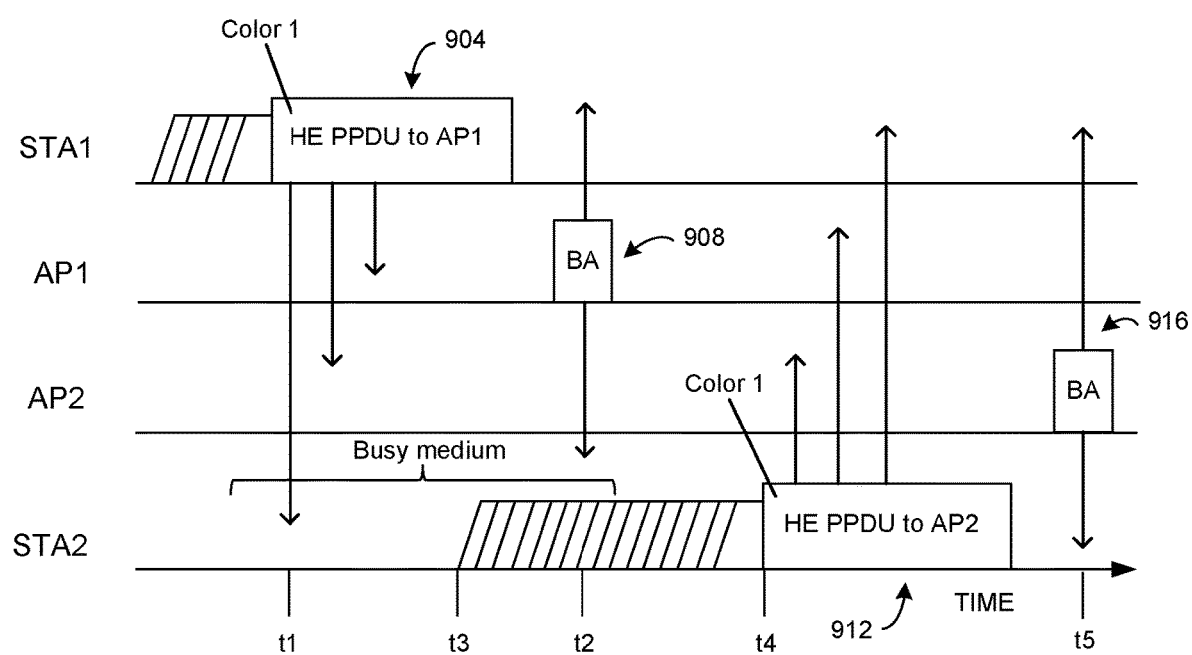
FIG. 9 is a message sequence diagram illustrating transmissions among multiple devices, according to an embodiment.

In some embodiments and/or scenarios, the same color is assigned to all virtual APs (corresponding to a single physical AP) to address problems with different virtual APs having different colors discussed above. For example, in some embodiments, the physical AP (e.g., the host processor 15) is configured to assign the same color to all of the corresponding virtual APs. FIG. 9 is a message sequence diagram illustrating multiple transmissions among STA1, STA2, a first virtual AP (AP1) and a second virtual AP (AP2), according to an embodiment. In this embodiment, all virtual APs associated with the same physical AP use the same BSS color. In an embodiment, AP1 and AP2 operate like the virtual APs 35-1 and 35-2 of FIG. 1, and STA1 and STA2 are configured like the client devices 25. STA1 is associated with AP1, whose BSS color will be referred to as Color 1, and STA2 is associated with AP2, which has the same BSS color—Color 1. At time t1, STA1 begins transmitting an HE PPDU 904 to AP1. At time t2, AP1 transmits a Block Acknowledgement (BA) 908 in response to the PPDU 904. At time t3, carries out a CCA procedure to determine whether the channel is clear. In carrying out the CCA procedure, STA2 detects PPDU 904, and measures the energy of PPDU 904 as being above the standard CCA threshold level (e.g., −82 dBm), but below the dynamic CCA level (e.g., −62 dBm). STA2 decodes the color field in the PHY preamble of PPDU 904 and identifies the BSS color associated with PPDU 904 as Color 1. Because Color 1 is also the BSS color associated with AP2, STA2 uses the standard CCA level (e.g., −82 dBm). Because the measured energy of PPDU 904 is greater than the standard CCA level, STA2 concludes that the communication medium is busy and initiates a back-off procedure, during which STA2 will not decrement a backoff counter of STA2. In an embodiment, STA2 also uses virtual carrier sensing to decide whether the backoff counter of STA2 should be decremented, e.g., when a network allocation vector (NAV) timer is not zero, STA2 is not permitted to decrement the backoff counter. Just after the end of BA 908, STA2 repeats the CCA procedure described above and determines that the communication medium is clear (e.g., overall energy level is below −62 dBm and the 802.11-based energy level is below −82 dBm). After the end of BA 908, the NAV timer of STA2 also becomes zero and thus STA2 can resume decrementing the backoff counter. At time t4, based on the determination that the communication medium is clear and that the backoff counter is zero, STA2 transmits an HE PPDU 912 to AP2. At time t5, AP2 transmits a BA 916 in response to the PPDU 912.

Figure 10A:
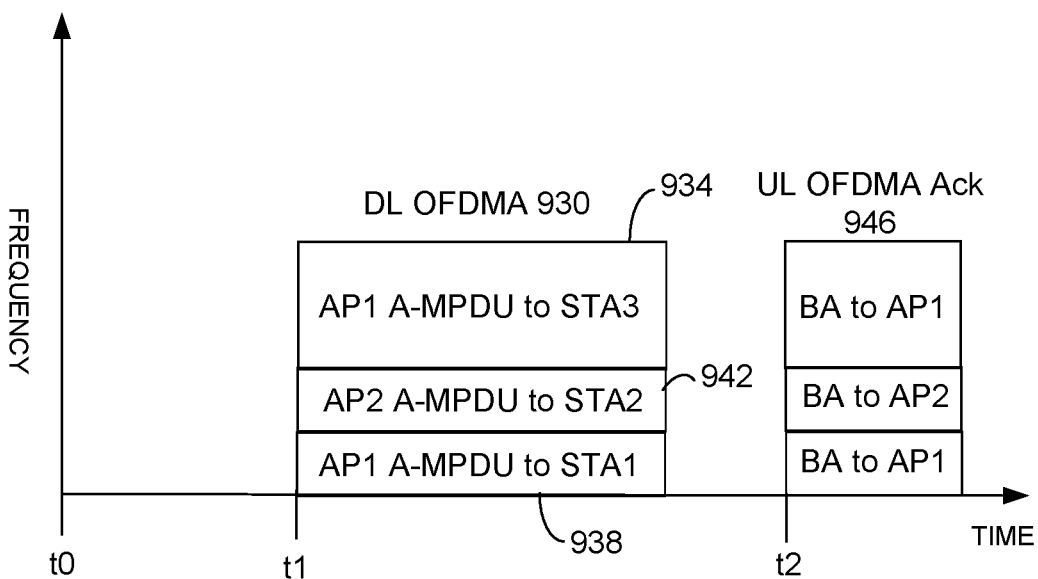
FIG. 10A is a message sequence diagram illustrating multi-user communications, according to an embodiment.

In embodiments in which each virtual AP corresponding to a single physical AP has a same color, OFDMA and/or MU-MIMO techniques may be utilized for simultaneous transmissions corresponding to different virtual APs. FIG. 10A is a diagram illustrating OFDMA transmissions between three client devices, STA1, STA2, and STA3, and two virtual APs, AP1 and AP2, which are implemented by the same physical AP, according to an embodiment. In the scenario illustrated in FIG. 10A, the physical AP sends DL traffic from virtual AP1 and virtual AP2 in a single DL OFDMA transmission 930. In FIG. 10A, STA1 and STA3 are associated with AP1 while STA2 is associated with AP2. The BSS color for AP1 is a value Color 1 and the BSS color for AP2 is also the value Color 1. At time t1, the physical AP transmits an A-MPDU 934 (corresponding to virtual AP1 and with the BSS color field set to Color 1) via DL OFDMA 930 to STA3 via a 20 MHz channel of AP1, and an A-MPDU 938 (corresponding to virtual AP1 and with the BSS color field set to Color 1) to STA1 using a primary 20 MHz channel (which is also the primary channel for AP2). The A-MPDU 934 has a 20 MHz bandwidth, whereas the A-MPDU 938 has a 10 MHz bandwidth.

Also at time t1, AP2 transmits an A-MPDU 942 via the DL OFDMA data unit 930 (with the BSS color bits set to Color 1) to STA2 using the primary 20 MHz channel of AP2. At time t2, STA1, STA2, and STA3 transmit a block acknowledgement (BA) 946 to virtual AP1 and virtual AP2.

Figure 10B:
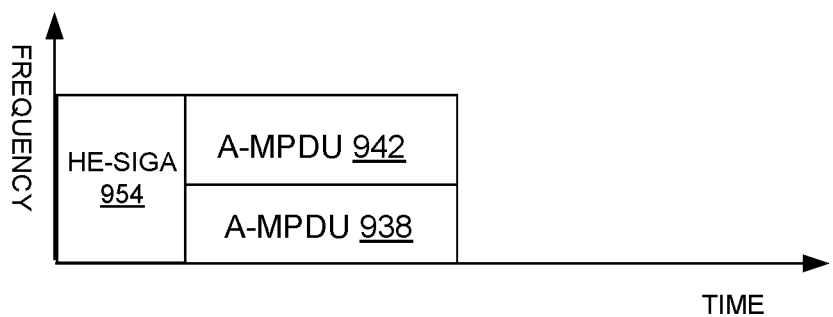
FIG. 10B is a diagram of a downlink orthogonal frequency division multiple access (DL OFDMA) transmission of FIG. 10A, according to an embodiment.

FIG. 10B is a diagram showing a portion of the DL OFDMA transmission 930 of FIG. 10A. In particular, FIG. 10B illustrates the portion of the DL OFDMA transmission 930 to STA1 and STA2. In particular, because virtual AP1 and virtual AP2 utilize the same color value (Color 1), a single HE-SIGA 954 (which includes a BSS color field set to Color 1) can be utilized for the A-MPDU 938 from virtual AP1 to STA1 and the A-MPDU 942 from virtual AP2 to STA2.

Figure 11A:
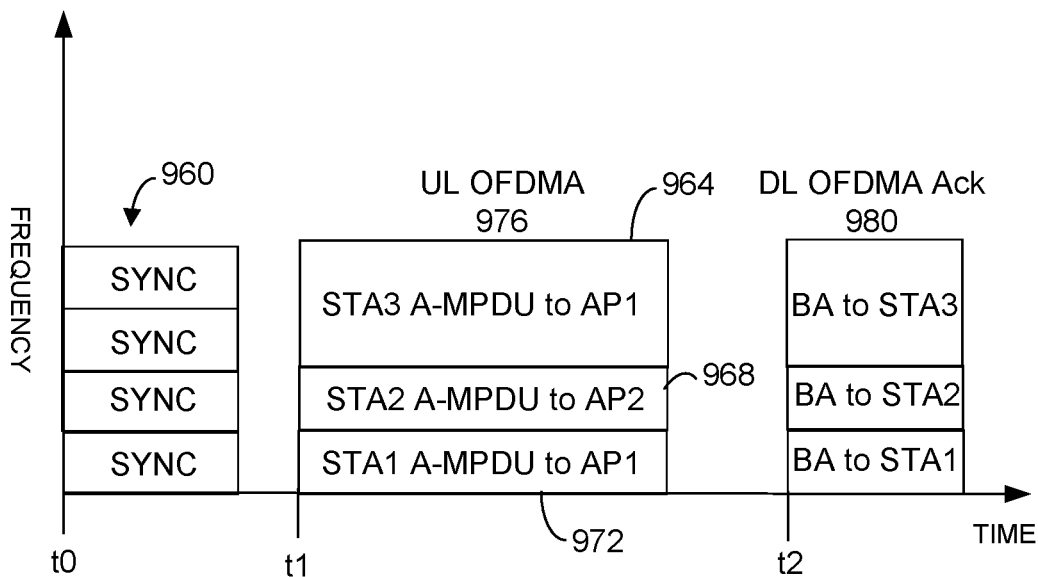
FIG. 11A is a message sequence diagram illustrating transmissions between two virtual access points and multiple clients, according to an embodiment.

FIG. 11A is a diagram illustrating OFDMA transmissions between three client devices, STA1, STA2, and STA3, and two virtual APs, AP1 and AP2, which are implemented by the same physical AP, according to an embodiment. In the scenario illustrated in FIG. 11A, the AP associations and BSS colors are the same as those described in conjunction with FIG. 10A. At time t0, either AP1 or AP2 (or both) transmits SYNC frames 960 to prompt UL OFDMA transmissions from STA1, STA2, and STA3 starting at a time t1. In response to the SYNC frames 960, at time t1, STA3 transmits an A-MPDU 964 to AP1, STA2 transmits an A-MPDU 968 to AP2, and STA1 transmits an A-MPDU 972 to AP1. A-MPDU 964, A-MPDU 968, and A-MPDU 972 form an UL OFDMA data unit 976. At time t2, in response to the UL OFDMA data unit 976, the physical AP transmits BAs 980 to STA1, STA2, and STA3, e.g., AP1 transmits BAs to STA1 and STA3, while AP2 transmits a BA to STA2.

Figure 11B:
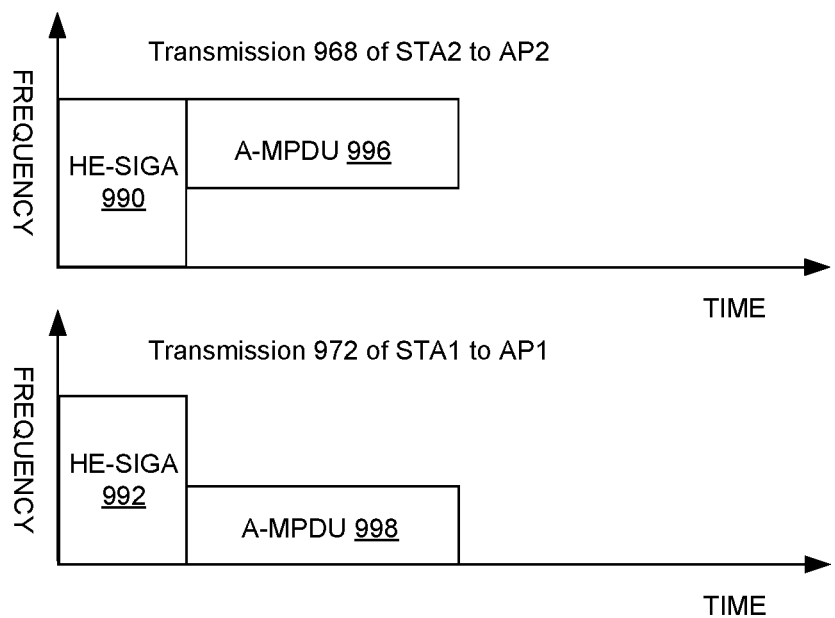
FIG. 11B is a set of diagrams illustrating transmissions of multiple clients as part of a multi-user transmission illustrated in FIG. 11A, according to an embodiment.

FIG. 11B is a set of diagrams illustrating the UL transmissions of STA1 and STA2 of FIG. 11A, according to an embodiment. For example, the transmission 968 is from STA2 to virtual AP2, whereas the transmission 972 is from STA1 to virtual AP1. Transmission 968 includes an HE-SIGA 990 with a BSS color field set to Color 1, and transmission 972 includes an HE-SIGA 992 with a BSS color field set to Color 1. Thus, HE-SIGA 990 is the same as HE-SIGA 992, in some embodiments.

Transmission 968 also includes an A-MPDU 996 with data corresponding to AP2, and transmission 972 includes an A-MPDU 998 with data corresponding to AP1.

In some embodiments, a physical AP determines a plurality of respective colors of a plurality of respective BSSs corresponding to a plurality of respective virtual APs implemented by the AP device. For example, in some embodiments, the AP assigns respective colors to respective virtual APs. Then, the physical AP device notifies client devices of the respective colors corresponding to the respective BSSs of the plurality of virtual APs of the physical AP, according to some embodiments. Then, when a client device is performing a CCA procedure, the client device can determine whether a transmission associated with a different color than the BSS with which the client device is associated corresponds to the same physical AP.

Figure 12:
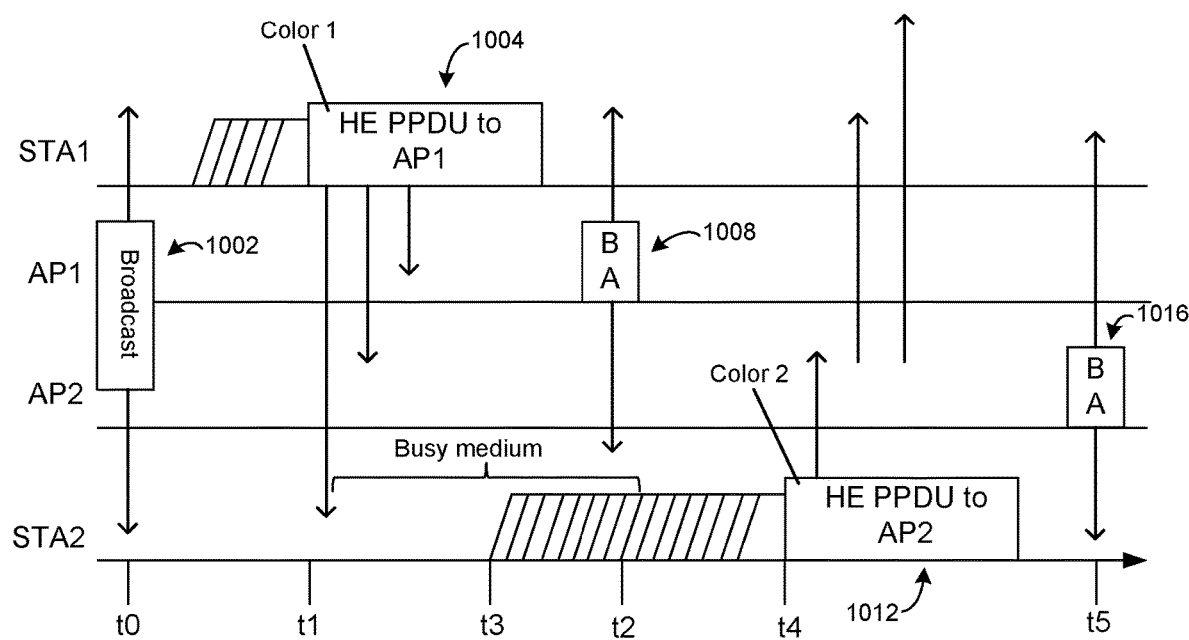
FIG. 12 is a message sequence diagram of transmissions among multiple devices, according to an embodiment.

FIG. 12 is a message sequence diagram illustrating multiple transmissions among STA1, STA2, a first virtual AP (AP1) and a second virtual AP (AP2), according to an embodiment. In this embodiment, a physical AP that operates multiple virtual APs assigns each virtual AP a BSS color and broadcasts a message 1002 that includes the BSS color of each of the virtual APs. In an embodiment, the colors of the two virtual APs are different—AP1 having Color 1 and AP2 having Color 2, for example. In an embodiment, AP1 and AP2 operate like the virtual APs 35-1 and 35-2 of FIG. 1, and that STA1 and STA2 are configured like the client devices 25. STA1 is associated with AP1 and STA2 is associated with AP2.

At time t0, either, or both of, AP1 and AP2 broadcasts a message 1002 (e.g., a beacon or another suitable management frame) that lists the BSS colors of each of the virtual APs that are implemented by the physical AP and corresponding BSSIDs, e.g. Color 1 and a BSSID1 of AP1, Color 2 and a BSSID2 of AP2. In the example illustrated in FIG. 12, the list of colors and matched BSSIDs in the message includes Color 1 BSSID1 of AP1, as well as Color 2 BSSID2 of AP2. In an embodiment, a first entry in the list indicates that AP1 has a BSS color of Color 1 and a second entry in the list indicates that AP2 has a BSS color of Color 2. In an embodiment, the management frame also indicates a single color to be used in UL MU transmissions by stations, and a single color that will be used by AP1 and AP2 in DL MU transmissions. For example, in one embodiment, STAs are configured to recognize that UL MU transmissions should utilize the color of the virtual AP that transmitted the management frame 1002 (e.g., the beacon), and that AP1 and AP2 will both use the color of the virtual AP that transmitted the management frame 1002 in DL MU transmissions. In another embodiment, the STAs are configured to utilize a predetermined color value (e.g., a maximum color value, a minimum color value, or some other suitable predetermined color value) for UL MU transmissions; and the STAs are configured to recognize that AP1 and AP2 will utilize the same predetermined color value (or another suitable predetermined color value) for DL MU transmissions.

At time t1, STA1 begins transmitting an HE PPDU 1004 to AP1. At time t2, AP1 transmits a Block Acknowledgement (BA) 1008 in response to the PPDU 1004. At time t1, STA2 detects the PPDU 1004, and measures the energy of the PPDU 1004 as being above the standard CCA threshold level (e.g., −82 dBm), but below the dynamic CCA level (e.g., −62 dBm). STA2 decodes a color field in a PHY preamble of the PPDU 1004 and identifies the BSS color of the PPDU 1004 as being Color 1. STA2 then selects which CCA level to use—standard or dynamic—depending on the list of colors provided in the message 1002 at time t0. For example, if Color 1 was included in the list of colors in message 1002, then STA2 knows that PPDU 1004 corresponds to a BSS implemented by the same physical AP to which STA2 is associated, and therefore uses the standard CCA level (e.g., −82 dBm). In the example illustrated in FIG. 12, at t1, the measured energy of the PPDU 1004 is greater than the standard CCA level. STA2 therefore concludes that the medium is busy. STA2 also sets NAV timer of STA2 per a Duration field in a frame in the detected PPDU 1004 if the energy of the PPDU 1004 is higher than the CCA level. At t3, STA2, which has frame for transmission, initiates a back-off procedure and sets a backoff counter. Just after the end of BA 1008, STA2 repeats the CCA procedure described above and determines that the medium is clear (e.g., overall energy level is below −62 dBm and the 802.11-based energy level is below −82 dBm). Therefore, STA2 begins decrementing the backoff counter. At time t4, based on a determination that the backoff counter is zero, STA2 transmits an HE PPDU 1012 to AP2. At time t5, AP2 transmits a BA 1016 in response to the PPDU 1020.

Figure 13A:
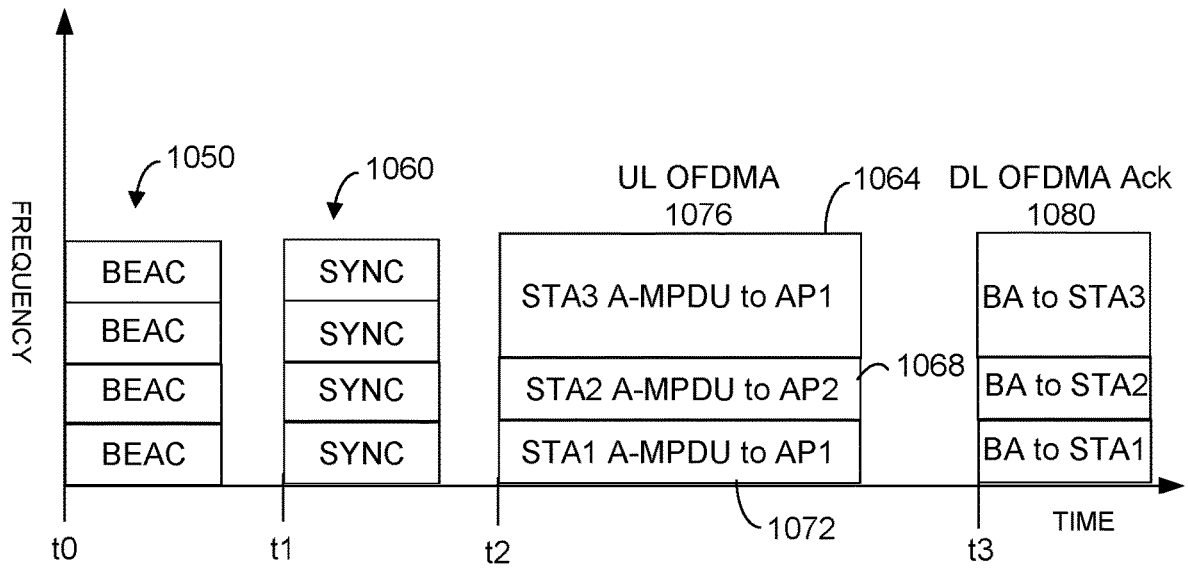
FIG. 13A is a message sequence diagram illustrating transmissions between two virtual access points and multiple clients, according to an embodiment.

With the help of management frame that notifies the color used in UL MU transmission and DL MU transmission, A-MPDUs from/to multiple virtual APs with different BSS colors can be transmitted in one MU transmission. FIG. 13A is a diagram illustrating OFDMA transmissions between three client devices, STA1, STA2, and STA3, and two virtual APs, AP1 with Color 1 and AP2 with Color 2, which are implemented by the same physical AP, according to an embodiment. In the scenario illustrated in FIG. 13A, Color 1 and Color 2 are different. At time t0, AP1 or AP2 (or both) broadcasts (e.g., in a beacon 1050 or another suitable management frame) a color value that is to be used for MU transmission, e.g., Color 1. At time t1, either AP1 or AP2 (or both) transmits SYNC frames 1060 to prompt UL OFDMA transmissions from STA1, STA2, and STA3 starting at a time t2. In response to the SYNC frames 1060, at time t2, STA3 transmits an A-MPDU 1064 to AP1 and Color 1 is included in a color field of PHY SIG of the PPDU that carry A-MPDU 1064, STA2 transmits an A-MPDU 1068 to AP2 and Color 1 is included in a color field in PHY SIG of the PPDU that carry A-MPDU 1068, and STA1 transmits an A-MPDU 1072 to AP1 and Color 1 is included in a color field of PHY SIG of the PPDU that carry A-MPDU 1072. A-MPDU 1064, A-MPDU 1068, and A-MPDU 1072 form an UL OFDMA data unit 1076. So the HE SIGs transmitted by STA1, STA2 and STA3 are same, in an embodiment. At time t3, in response to the UL OFDMA data unit 1076, the physical AP transmits BAs 1080 to STA1, STA2, and STA3 and Color 1 is included in a color field of PHY SIG of the PPDU that carries BAs 1080, e.g., AP1 transmits BAs to STA1 and STA3, while AP2 transmits a BA to STA2. So the HE SIGs transmitted by AP1 and AP2 in connection with the BAs 1080 are the same, in an embodiment.

Figure 13B:
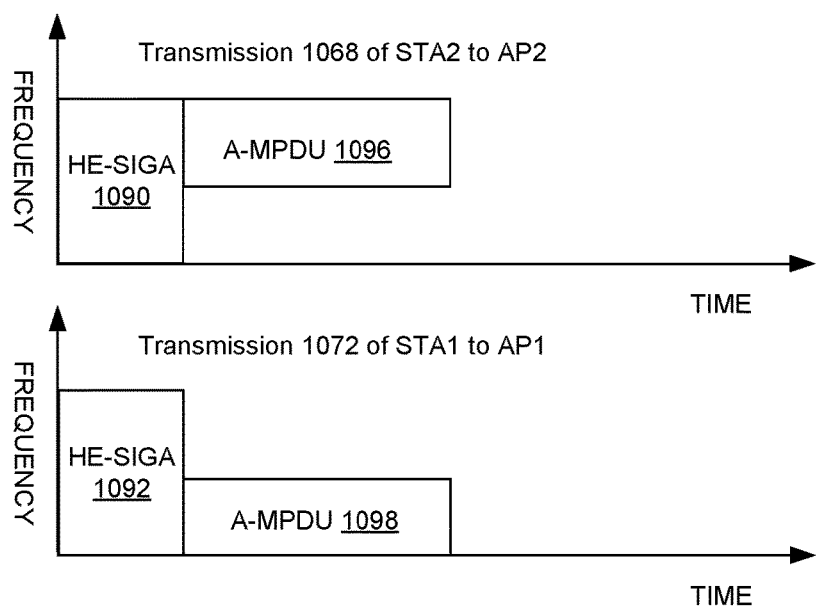
FIG. 13B is a set of diagrams illustrating transmissions of multiple clients as part of a multi-user transmission illustrated in FIG. 13A, according to an embodiment.

FIG. 13B is a set of diagrams illustrating the UL transmissions of STA1 and STA2 of FIG. 13A, according to an embodiment. For example, the transmission 1068 is from STA2 to virtual AP2, whereas the transmission 1072 is from STA1 to virtual AP1. Transmission 1068 includes an HE-SIGA 1090 with a BSS color field set to Color 1, and transmission 1072 includes an HE-SIGA 1092 with a BSS color field set to Color 1. Thus, HE-SIGA 1090 is the same as HE-SIGA 1092, in some embodiments.

Transmission 1068 also includes an A-MPDU 1096 with data corresponding to AP2, and transmission 1072 includes an A-MPDU 1098 with data corresponding to AP1.

Figure 14:
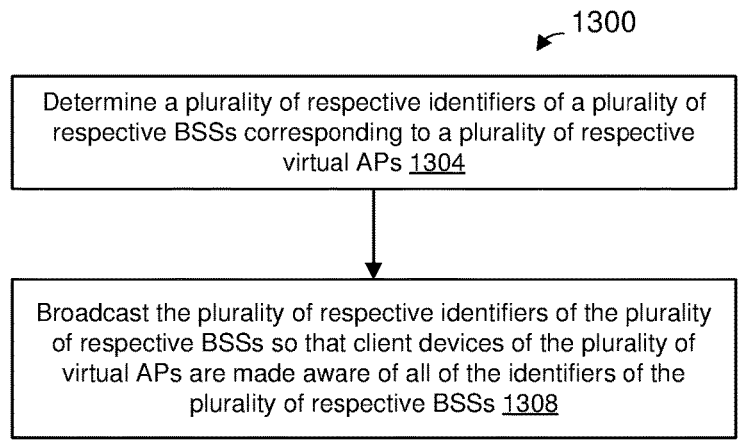
FIG. 14 is a flow diagram of an example method for informing devices in a wireless network of network identifiers utilized by multiple basic service sets (BSSs) implemented in the wireless network, according to an embodiment.

FIG. 14 is a flow diagram of an example method 1300 for informing client devices of a physical AP of BSS identifiers (e.g., colors) of virtual APs implemented by the physical AP, according to an embodiment. In some embodiments, the method 1300 is implemented by the AP 14 (FIG. 1). For example, in some embodiments, the network interface device 16 is configured to implement the method 1300. As another example, in some embodiments, the host 15 is configured to implement at least a portion of the method 1300. As another example, in some embodiments, the host 15 and the network interface device 16 are configured to implement the method 1300. In other embodiments, another suitable communication device is configured to implement the method 1300.

At block 1304, a plurality of respective identifiers (e.g., colors) of a plurality of respective BSSs corresponding to a plurality of respective virtual APs implemented by a physical AP device are determined.

At block 1308, the plurality of respective identifiers (e.g., colors) determined at block 1304 are communicated to client devices of the physical AP so that client devices of the plurality of virtual APs are made aware of all of the identifiers of the plurality of respective BSSs. In some embodiments, block 1308 also includes indicating to STAs a single color value that is to be used by STAs for MU UL transmissions. In some embodiments, block 1308 also includes indicating to STAs a single color value that will be used by virtual APs for MU DL transmissions. In some embodiments, the single color value that is to be used by STAs for MU UL transmissions is the same as the single color value that will be used by virtual APs for MU DL transmissions. In some embodiments, block 1308 comprises communicating the BSS identifiers of all of the BSSs in a single message. For example, in an embodiment, a list of the BSS identifiers of all of the BSSs (and corresponding BSSIDs) is included in a single physical layer data unit that is broadcast by the physical AP to the client devices of the physical AP. In some embodiments, the single message (e.g., the single PPDU) also indicates the single color value that is to be used by STAs for MU UL transmissions and/or indicates the single color value that virtual APs will use for MU DL transmissions. In some embodiments, the single color value that is to be used by STAs for MU UL transmissions is the same as the single color value that will be used by virtual APs for MU DL transmissions. In some embodiments, the list of the BSS identifiers of all of the BSSs (and optionally one or more of i) the corresponding BSSIDs, ii) the indication of the single color value that is to be used by STAs for MU UL transmissions, and/or iii) the single color value that will be used by virtual APs for MU DL transmissions) is included in a beacon frame or another suitable management frame. In some embodiments, respective portions of the list of the BSS identifiers of all of the BSSs (and optionally one or more of i) the corresponding BSSIDs, ii) the indication of the single color value that is to be used by STAs for MU UL transmissions, and/or iii) the single color value that will be used by virtual APs for MU DL transmissions) are included in respective different physical layer data units transmitted by the physical AP at different times.

In some embodiments, the method 1300 further includes assigning the plurality of respective identifiers (e.g., colors) to the plurality of respective BSSs corresponding to the plurality of respective virtual APs. In some embodiments, the method 1300 further includes assigning a plurality of respective BSSIDs to the plurality of virtual APs. In some embodiments, the method 1300 further includes setting up the plurality of virtual APs at the physical AP.

According to an embodiment, each virtual AP collocated in the same physical AP uses identical values in a first set of bits (e.g., one of the most significant bits or the least significant bits) of a BSS color value, whereas each virtual AP collocated in the same physical AP uses different values in a second set of bits (e.g., the other of the most significant bits or the least significant bits) of the BSS color value. For instance, in an illustrative embodiment, a BSS color field comprises two parts: m least significant bits (also referred to as a "virtual AP ID part"), which are used to identify virtual APs, and n-m most significant bits (also referred to as the "segment ID part"), which are used to identify a common physical AP for the virtual APs. Each virtual AP, in this embodiment, has identical values for the segment ID part, but a unique (at least for that physical AP) value for the virtual ID part.

Figure 15:
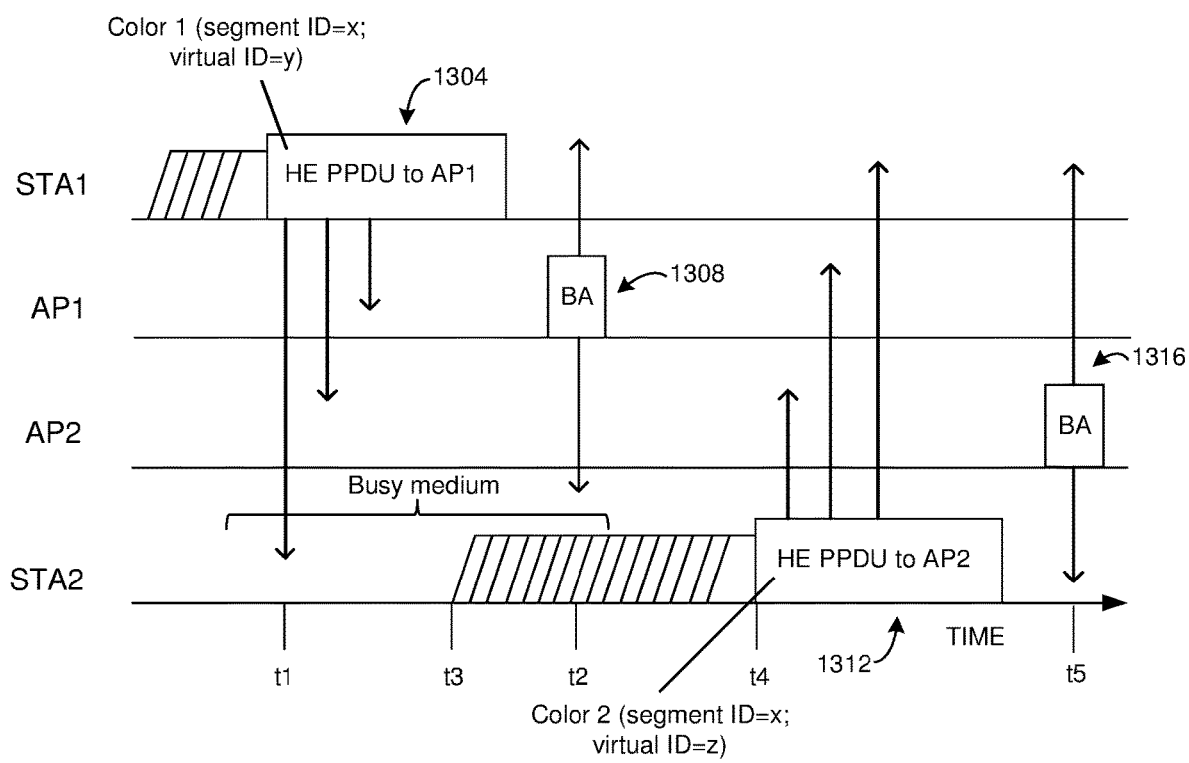
FIG. 15 is a message sequence diagram of transmissions among multiple devices, according to an embodiment.

FIG. 15 is a message sequence diagram illustrating multiple transmissions among STA1, STA2, a first virtual AP (AP1) and a second virtual AP (AP2), according to an embodiment. At time t1, STA1 begins transmitting an HE PPDU 1304 to AP1. At time t2, AP1 transmits a Block Acknowledgement (BA) 1308 in response to the PPDU 1304. A color field in a PHY preamble of the PPDU 1304 is set to a value Color 1. In an embodiment, a first set of bits of the value Color 1 corresponds to a segment ID set to a value x, and a second set of bits of the value Color 1 corresponds to a virtual ID set to a value y.

At time t1, STA2 detects the PPDU 1304, and measures the energy of the PPDU 1304 as being above the standard CCA threshold level (e.g., −82 dBm), but below the dynamic CCA level (e.g., −62 dBm). STA2 decodes the segment ID part of the color field of the PHY preamble of the PPDU 1304 and determines that the segment ID is the same as a segment ID of a color of a BSS to which STA2 is associated (e.g., Color 2, where a first set of bits of the value Color 2 corresponds to a segment ID set to the value x, and a second set of bits of the value Color 2 corresponds to a virtual ID set to a value z). STA2 therefore uses the standard CCA level. Because the measured energy of the PPDU 1304 is greater than the standard CCA level, STA2 concludes that the channel is busy and sets a NAV timer per duration field(s) in the detected MPDUs carried in PPDU 1304. At time t4, a back-off counter of STA2 becomes zero. So at time t5, STA2 transmits an HE PPDU 1312 to AP2. At time t6, AP2 transmits a BA 1316 in response to the PPDU 1312.

Figure 16:
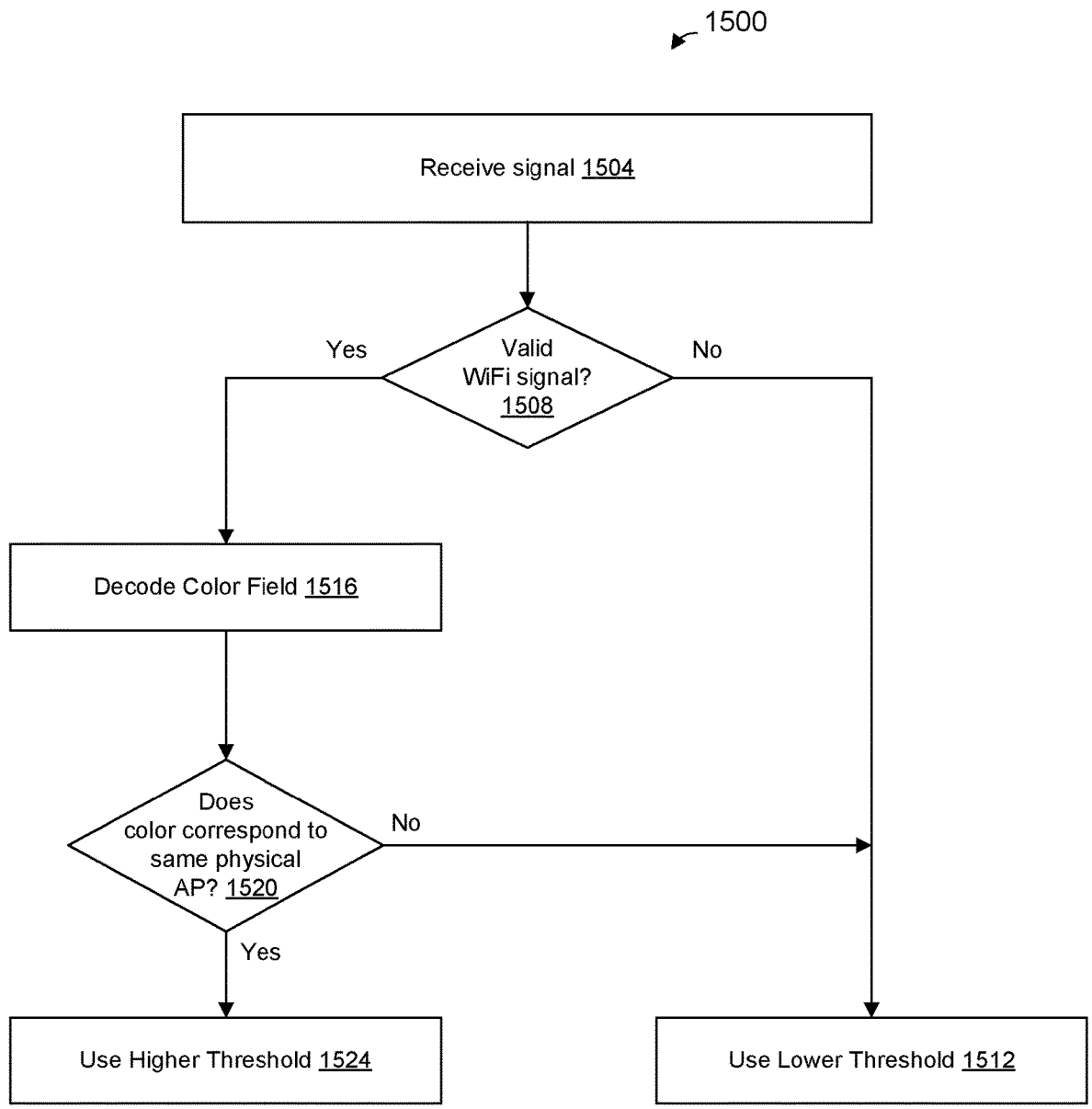
FIG. 16 is a flow diagram of an example method for determining whether a wireless communication medium is busy, according to an embodiment.

FIG. 16 is a flow diagram of an example method 1500 for performing a CCA procedure, according to an embodiment. In some embodiments, the method 1500 is implemented by the client device 25-1 (FIG. 1) and/or the AP 14. For example, in some embodiments, the network interface device 16 is configured to implement the method 1500. As another example, in some embodiments, the host 15 and the network interface device 16 are configured to implement the method 1500. For example, in some embodiments, the network interface device 27 is configured to implement the method 1500. As another example, in some embodiments, the host 26 and the network interface device 27 are configured to implement the method 1500. In other embodiments, another suitable communication device is configured to implement the method 1500.

At block 1504, a signal is received. At block 1508, it is determined whether the signal is a signal that conforms to a particular one or more communication protocols recognized by the client device 25-1. For example, in an embodiment, it is determined whether the signal conforms to a WiFi communication protocol. As another example, in an embodiment, it is determined whether the signal conforms to a communication protocol defined by the IEEE 802.11 Standard. In other embodiments, it is determined whether the signal conforms to another suitable communication protocol. Block 1508 comprises analyzing the signal to determine whether the signal includes a PHY preamble that conforms to a particular communication protocol, or to one of several particular communication protocols, in various embodiments.

If it is determined at block 1508 that the signal is not a signal that conforms to the particular communication protocol (or one of several communication protocols, in some embodiments) recognized by the client device 25-1, the flow proceeds to block 1512. At block 1512, an energy level of the signal is compared a first threshold as part of the CCA procedure. The first threshold is lower than a second threshold also used as part of the CCA procedure, as will be described below.

On the other hand, if it is determined at block 1508 that the signal is a signal that conforms to the particular communication protocol (or one of several communication protocols, in some embodiments) recognized by the client device 25-1, the flow proceeds to block 1516. At block 1516, a color field in a PHY preamble of the signal is decoded to determine a color value corresponding to the signal received at block 1504.

At block 1520, it is determined whether the color value determined at block 1516 corresponds to a color value corresponding to a physical AP with which the client 25-1 is associated. For example, in one scenario, the client 25-1 is associated with a first BSS managed by a first virtual AP1 implemented by the physical AP, where the first BSS has a color value Color 1. In embodiments in which all BSSs managed by virtual APs implemented by the physical AP have the same color, the client 25-1 compares the color value determined at block 1516 with the value Color 1 and if the color value determined at block 1516 is not Color 1, the client 25-1 determines that the signal received at block 1516 does not correspond to the same physical AP. On the other hand, in such embodiments, if the color value determined at block 1516 is Color 1, the client 25-1 determines that the signal received at block 1516 corresponds to the same physical AP.

In embodiments in which BSSs managed by virtual APs implemented by the physical AP have different colors, and the physical AP previously provided the client 25-1 with the color values of the BSSs of the virtual APs implemented by the physical AP, the client 25-1 compares the color value determined at block 1516 with the color values provided by the physical AP. For example, after receiving the color values of the BSSs of the virtual APs implemented by the physical AP, the client device 25-1 stores the color values in a memory of or associated with the network interface device 27. Then, the client device 25-1 accesses the color values in the memory as part of implementing block 1520. If the color value determined at block 1516 does not match any of the color values provided by the physical AP, the client 25-1 determines that the signal received at block 1504 does not correspond to the same physical AP. On the other hand, in such embodiments, if the color value determined at block 1516 matches one of the color values provided by the physical AP, the client 25-1 determines that the signal received at block 1504 corresponds to the same physical AP.

In embodiments in which BSSs managed by virtual APs implemented by the physical AP have colors values in which a respective first part of the each color value has a same value (e.g., a segment ID part) and a respective second part of each color value has a different value (e.g., a virtual ID part), the client 25-1 compares a first part of the color value determined at block 1516 with a first part of Color 1. If the first part of the color value determined at block 1516 is different than the first part of Color 1, the client 25-1 determines that the signal received at block 1504 does not correspond to the same physical AP. On the other hand, in such embodiments, if the first part of the color value determined at block 1516 is the same as the first part of Color 1, the client 25-1 determines that the signal received at block 1504 corresponds to the same physical AP.

If it is determined at block 1520 that signal received at block 1504 does not correspond to the same physical AP, the flow proceeds to block 1512. On the other hand, if it is determined at block 1520 that signal received at block 1504 does correspond to the same physical AP, the flow proceeds to block 1524. At block 1524, the energy level of the signal is compared the second threshold as part of the CCA procedure, where the second threshold is higher than the first threshold.

In some embodiments, OFDMA transmissions with multiple BSS colors are not permitted. Thus, in some embodiments, a physical AP is not permitted to transmit data corresponding to different BSSs with different colors in a single DL OFDMA PHY data unit. Similarly, in some embodiments, client devices corresponding to different BSSs with different colors are not permitted to transmit as part of a single UL OFDMA transmission.

In some embodiments, to avoid the limitation discussed above with respect to OFDMA transmissions and different BSS colors, a physical AP may select a single color value for UL/DL MU transmissions and notifies the STAs of the selected color value. The physical AP sets color fields in PHY preamble of a DL OFDMA data unit to the single value even though the DL OFDMA data unit includes transmissions corresponding to multiple BSSs with different color values. The STAs associated with different virtual APs set color fields in PHY preamble of a UL OFDMA data unit to the selected single value even though the UL OFDMA data unit includes transmissions corresponding to multiple BSSs with different color values.

Figure 17:
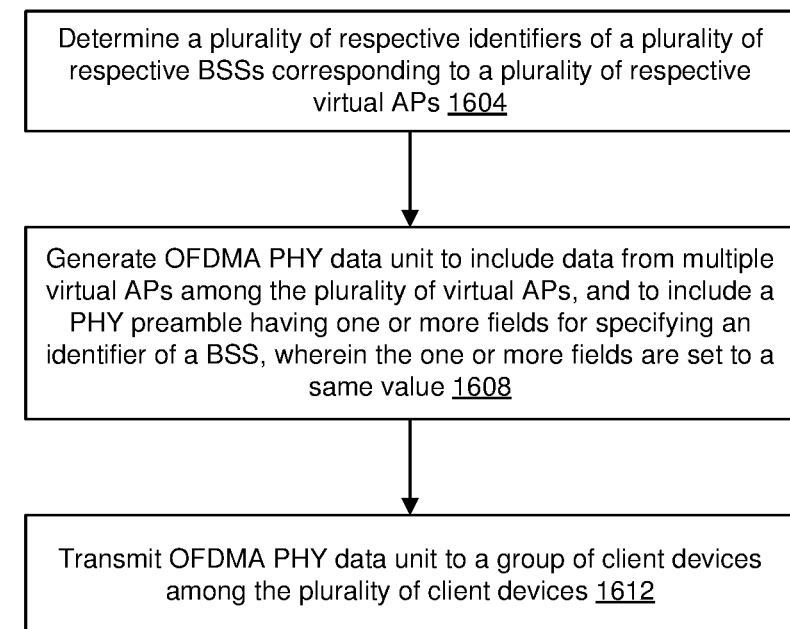
FIG. 17 is a flow diagram of an example method for performing a multi-user wireless transmission, according to an embodiment.

FIG. 17 is a flow diagram of an example method 1600 for performing an OFDMA transmission, according to an embodiment. In some embodiments, the method 1600 is implemented by the AP 14 (FIG. 1). For example, in some embodiments, the network interface device 16 is configured to implement the method 1600. As another example, in some embodiments, the host 15 is configured to implement at least a portion of the method 1600. As another example, in some embodiments, the host 15 and the network interface device 16 are configured to implement the method 1600. In other embodiments, another suitable communication device is configured to implement the method 1600.

At block 1604, a plurality of identifiers (e.g., color values) of a plurality of respective BSSs are determined, the respective BSSs corresponding to a plurality of respective virtual APs implemented by a physical AP device. In an embodiment, one of the plurality of identifiers is selected for MU transmissions and the AP device notifies STAs of the selected identifier.

At block 1608, an OFDMA PHY data unit is generated, wherein the OFDMA PHY data unit is generated to include data from multiple virtual APs among the plurality of virtual APs. Block 1608 includes generating a PHY preamble that includes one or more fields for specifying an identifier of a BSS, wherein the one or more fields are set to a same value (e.g., the selected identifier).

For example, in an embodiment, one identifier from the plurality of respective identifiers of the plurality of respective BSSs is selected, and the one or more fields in the PHY preamble are set to the selected one identifier.

As another example, in some embodiments, each identifier includes a respective first set of bits and a respective second set of bits, and block 1604 includes determining the respective first sets of bits to be a same first value and determining the respective second sets of bits to be respective second values. In some embodiments, block 1608, each of the one or more fields in the PHY preamble has a first set of bits set to the same first value and a second set of bits set to a third value different than all of the respective second values. As an illustrative example, the third value is zero, whereas all of the respective second values are non-zero values, according to an embodiment. In other embodiments, however, the third value is a suitable non-zero value (e.g., all ones).

At block 1612, the OFDMA PHY data unit is transmitted to a group of client devices among the plurality of client devices.

To respond to the OFDMA PHY data unit transmitted at block 1612, in an embodiment, the respective client devices transmit an acknowledgment to the physical AP using the same BSS identifier as the BSS identifier used in the OFDMA PHY data unit transmitted at block 1612. For example, referring to FIG. 10A, at time t2, all of the stations respond to the DL OFDMA transmission 930 in the single UL OFDMA transmission 946 using the BSS color in the PHY preamble of the DL OFDMA 930.

Referring again to FIG. 17, in some embodiments, the method 1600 includes other acts such as one or more of: setting up the plurality of virtual APs, assigning the plurality of identifiers to the BSSs, with the plurality of client devices, etc., according to various embodiments.

As another example, in an embodiment, the method 1600 further includes generating a single user PHY data unit corresponding to only one virtual AP, wherein generating the single user PHY data unit comprises generating a PHY preamble of the single user PHY data unit that includes one or more fields for specifying an identifier of a BSS, wherein the one or more fields are set to the identifier corresponding to the one virtual AP, and wherein the identifier corresponding to the one virtual AP is different than the same value in the PHY preamble of the OFDMA PHY data unit; and transmitting the single user PHY data unit to one of the client devices among the plurality of client devices.

Figure 18:
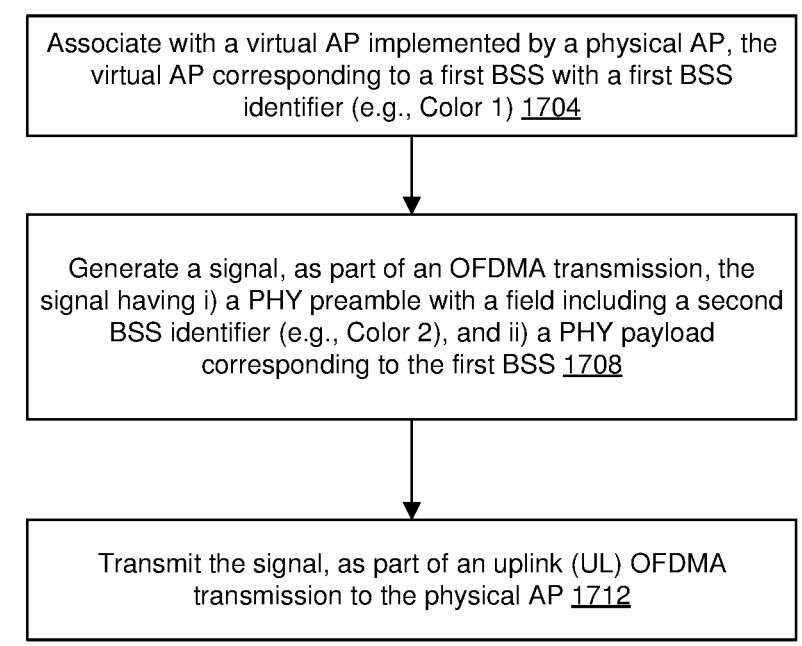
FIG. 18 is a flow diagram of an example method for performing a transmission as part of a multi-user wireless transmission, according to an embodiment.

FIG. 18 is a flow diagram of an example method 1700 for performing an OFDMA transmission, according to an embodiment. In some embodiments, the method 1700 is implemented by the client device 25-1 (FIG. 1). For example, in some embodiments, the network interface device 27 is configured to implement the method 1700. As another example, in some embodiments, the host 26 and the network interface device 16 are configured to implement the method 1700. In other embodiments, another suitable communication device is configured to implement the method 1700.

At block 1704, the communication device 25-1 associates with a virtual AP implemented by a physical AP, the virtual AP corresponding to a first BSS, wherein the first BSS corresponds to a first BSS identifier (e.g., a first color value (Color 1)).

At block 1708, as part of an OFDMA transmission (e.g., an UL OFDMA transmission to the physical AP), a signal is generated, the signal having i) a PHY preamble with a field including a second BSS identifier (e.g., a second color value (Color 2), and ii) a PHY payload corresponding to the first BSS.

For example, in an embodiment, the second BSS identifier corresponds to a second BSS of another virtual AP implemented by the physical AP. For instance, in an embodiment, a set of BSS identifiers is previously received from the physical AP, wherein the set of BSS identifiers include identifiers of BSSs corresponding to BSSs of a set of virtual APs implemented by the physical AP, the second BSS identifier is selected from the set of identifiers received from the physical AP. As an illustrative embodiment, the physical AP indicates that the second BSS identifier, from among the list of BSS identifiers, should be used for UL OFDMA transmissions. For instance, in an embodiment, the second BSS identifier is at a position in (e.g., a top of) the list of BSS identifiers, where the position in the list indicates that the second BSS identifier should be used for UL OFDMA transmissions. In another embodiment, the second BSS identifier is flagged in the list of BSS identifiers, where the flagging of the second BSS identifier indicates that the second BSS identifier should be used for UL OFDMA transmissions.

In some embodiments, the physical AP previously informs the client device 25-1 to use the second BSS identifier (in PHY preambles) when participating in UL OFDMA transmissions via one or more of a broadcast frame, a management frame, a control frame, a beacon frame, etc. In an embodiment, the physical AP informs the client device 25-1 to use the second BSS identifier (in PHY preambles) when participating in the UL OFDMA transmission via a SYNC frame that also prompts the client device 25-1 to transmit the signal at block 1708 as part of the UL OFDMA transmission.

As another example, in some embodiments, a first set of bits of the second BSS identifier is equal to a corresponding first set of bits of the first BSS identifier; and a second set of bits of the second BSS identifier is different than a corresponding second set of bits of the first BSS identifier. For instance, in an embodiment, the client device 25-1 sets the first set of bits of the second BSS identifier equal to the corresponding first set of bits of the first BSS identifier, and sets the second set of bits of the second BSS identifier to a predetermined value that is different than the corresponding second set of bits of the first BSS identifier. In an embodiment, the predetermined value is zero. In other embodiments, the predetermined value is another suitable value other than zero (e.g., all ones).

At block 1712, the signal is transmitted to the physical AP as part of the UL OFDMA transmission. For example, in an embodiment, the signal is transmitted simultaneously with other transmissions from other client devices, the other transmissions also being part of the UL OFDMA transmission.

To respond to the OFDMA PHY data unit transmitted at block 1712, in an embodiment, the physical AP transmits an OFDMA acknowledgment to the client devices using the same BSS identifier as the BSS identifier used in the OFDMA PHY data unit transmitted at block 1712. For example, referring to FIG. 11A, at time t2, the physical AP responds to the UL OFDMA transmission 976 in the single DL OFDMA transmission 980 using the BSS color that was included in the PHY preamble of the UL OFDMA 976.

Referring again to FIG. 18, in some embodiments, the method 1700 also includes one or more other acts, such as receiving a SYNC frame that prompts the transmission at block 1712 as part of the UL OFDMA transmission, exchanging single user PHY data units with the physical AP, wherein the single user PHY data units include PHY preambles, each PHY preamble having a field including the first BSS identifier, etc. In some embodiments in which the method 1700 includes receiving a SYNC frame that prompts the transmission at block 1712, the SYNC frame indicates that the client device is to use the second BSS identifier in the PHY preamble of the signal generated at block 1708.

In an embodiment, when the BSS colors of all of the virtual APs of a given physical AP are advertised by the physical AP and a selected color to be used for MU transmissions through the use of a Multiple BSS Color element (e.g., a set of BSS color bits for each separate virtual AP transmitted via a beacon, or a set of BSS colors and corresponding BSSIDs for each separate virtual AP transmitted via beacon, and an indication of a selected color for MU transmissions), the client devices send the UL traffic to the virtual APs on a single OFDMA UL transmission using the following rules: (1) The physical AP transmits a management frame that indicates a color for UL OFDMA (e.g. in a Multiple BSS Color element) or a SYNC frame that indicates a BSS color for UL OFDMA. (2) All STAs that associate with a virtual BSS need to receive the SYNC, which may originate from any of the virtual APs on that physical AP (i.e., any virtual AP defined in the Multiple BSSID element transmission—e.g., the beacon). In another embodiment, the STAs do not respond in a single UL OFDMA transmission, but rather in separate single user transmissions.

According to an embodiment, each virtual AP collocated in the same physical AP use identical values in a sub-portion (e.g., the most significant bits or the least significant bits) of a BSS color field. In an embodiment, the BSS color field is separated to two parts: m least significant bits (also referred to as a "virtual AP ID part"), which are used to identify virtual APs, and n-m most significant bits (also referred to as the "segment ID part"), which are used to identify a common physical AP for the virtual APs. Each virtual AP in this embodiment has identical values for the segment ID part, but a unique (at least for that physical AP) value for the virtual ID part. In an embodiment, the virtual AP ID part is the same for all virtual APs of a single physical AP. In another embodiment, the virtual AP ID part is different for each virtual AP on the single physical AP.

In some embodiments, the physical AP uses one value of the virtual AP ID part for the color value included in a PHY preamble of a DL OFDMA communication, e.g., all zeros in virtual AP ID part, all ones in the virtual AP ID part, etc.

In one embodiment, a method for communicating on a wireless network includes, on a physical access AP: setting up a plurality of virtual APs; assigning a basic service set (BSS) color to each of the plurality of virtual APs; and broadcasting a message that identifies each of the plurality of APs and the BSS color assigned to each of the plurality of APs.

In other embodiments, the method includes one of, or any suitable combination of two or more of, the following features.

The method also includes transmitting, to a first client device on behalf of a first virtual AP of the plurality of virtual APs, a first packet data unit comprising a header, wherein the header comprises data representing the color of the first virtual AP; and transmitting, to a second client device on behalf of a second virtual AP of the plurality of virtual APs, a second packet data unit comprising a header, wherein the header comprises data representing the BSS color of the second virtual AP.

The physical AP transmits the first and second packet data units in a single downlink orthogonal frequency division multiple access (OFDMA) transmission.

The BSS color assigned to the first virtual AP is identical to the BSS color assigned to the second virtual AP; and the method further includes: transmitting, to a first client device on behalf of a first virtual AP of the plurality of virtual APs, a first packet data unit comprising a header, wherein the header comprises data representing the BSS color; and transmitting, to a second client device on behalf of a second virtual AP of the plurality of virtual APs, a second packet data unit comprising a header, wherein the header comprises data representing the BSS color.

The method further includes receiving, in response to the first and second packet data units, a single uplink OFDMA transmission from the first and second client devices, wherein the uplink OFDMA transmission comprises packet data unit from the first client device and a packet data unit from the second client device, and wherein the packet data unit from the first client device includes a header comprising the BSS color and the packet data unit from the second client device includes a header comprising the BSS color.

The method further includes selecting a BSS color of the first virtual AP or the BSS color of the second virtual AP; transmitting, on behalf of at least one of the plurality of virtual APs, a SYNC message, wherein the SYNC message identifies the selected BSS color to be the BSS color of the SYNC message; and receiving, in response to the SYNC message, an uplink OFDMA transmission from a plurality of client devices, wherein the uplink OFDMA transmission comprises a header including the selected BSS color.

The method further includes transmitting, in response to the uplink OFDMA transmission, an ACK comprising data representing the BSS color.

The BSS color assigned to the first virtual AP is identical to the BSS color assigned to the second virtual AP.

In another embodiment, a method for communicating on a wireless network, the method includes, on a physical AP: setting up a plurality of virtual APs; assigning a BSS color to each of the plurality of virtual APs, such that: the BSS color of each virtual AP is divided into at least a virtual AP identifier part and a segment identifier part, and the virtual AP identifier is the same for each virtual AP; transmitting, on behalf of the first virtual AP, a first packet data unit to a first client device, wherein a header of the first packet data unit includes the BSS color assigned to the first virtual AP; and transmitting, on behalf of the second virtual AP, a second packet data unit to a second client device, wherein a header of the second packet data unit includes the BSS color assigned to the second virtual AP.

In other embodiments, the method includes one of, or any suitable combination of two or more of, the following features.

The method further comprises transmitting, on behalf of a first virtual AP of the plurality of virtual APs, a first packet data unit comprising a PHY header, wherein the PHY header comprises data representing the color of the first virtual AP; and transmitting, on behalf of a second virtual AP of the plurality of virtual APs, a second packet data unit comprising a header, wherein the header comprises data representing the BSS color of the second virtual AP.

The physical AP transmits the first and second packet data units in a single DL OFDMA transmission.

The method further comprises: selecting a BSS color of the first virtual AP or the BSS color of the second virtual AP; transmitting, on behalf of at least one of the plurality of virtual APs, a SYNC message, wherein the SYNC message identifies the selected BSS color to be the BSS color of the SYNC message; and receiving, in response to the SYNC message, an uplink OFDMA transmission from a plurality of client devices, wherein the uplink OFDMA transmission comprises a header including the selected BSS color.

The method further comprises transmitting, in response to the uplink OFDMA transmission, an ACK comprising data representing the BSS color.

In another embodiment, a method of determining whether a wireless communication medium is clear includes, on client device: associating with a first virtual access point (AP) of a plurality of virtual APs implemented by a physical AP; receiving, from a physical AP, a message identifying the basic service set (BSS) color of each of the plurality of virtual APs implemented by the physical AP; detecting a packet data unit; measuring the energy of the packet data unit; decoding a BSS color from the packet data unit; if the decoded BSS color is the same as a BSS color in the message from the physical AP, then setting an energy threshold to a first level; if the decoded BSS color is not the same as any BSS color in the message from the physical AP, then setting an energy threshold to a second level, wherein the second level is higher than the first level; and transmitting or refraining from transmitting a packet data unit based on a comparison of the measured energy and the energy threshold.

In other embodiments, the method includes one of, or any suitable combination of two or more of, the following features.

The received message is a beacon; and the method further includes: detecting the packet data unit comprises detecting a packet data unit transmitted from a second virtual AP of the plurality of APs; decoding the BSS color comprises decoding a header of the detected packet data unit; identifying the BSS color as being one of the BSS colors contained in the beacon; and in response to identifying the BSS color as being one of the BSS colors contained in the beacon, setting the energy threshold to first level.

The first threshold level is a static clear channel assessment level.

The second threshold level is a dynamic clear channel assessment level.

In another embodiment, a method of determining whether a wireless communication medium is clear includes, on a client device: associating with a first virtual access point (AP) of a plurality of virtual APs implemented by a physical AP, wherein the first virtual AP has a virtual AP identifier; detecting a packet data unit that includes a header comprising a basic service set (BSS) color field, wherein the BSS color field comprises a virtual AP identifier part and a segment identifier part; measuring the energy of the packet data unit; decoding the virtual AP part; if the decoded virtual AP part is the same as the virtual AP identifier of the first virtual AP, then setting an energy threshold to a first level; if the decoded virtual AP part is not the same as the virtual AP identifier of the first virtual AP, then setting an energy threshold to a second level, wherein the second level is higher than the first level; and transmitting or refraining from transmitting a packet data unit based on a comparison of the measured energy and the energy threshold.

In other embodiments, the method includes one of, or any suitable combination of two or more of, the following features.

Each of the plurality of virtual APs is assigned the same virtual AP identifier and the same segment identifier.

Each of the plurality of virtual APs is assigned a different virtual AP identifier and the same segment identifier.

At least some of the various blocks, operations, and techniques described above may be implemented utilizing hardware, a processor executing firmware instructions, a processor executing software instructions, or any combination thereof. Examples of suitable hardware include a microprocessor, microcontroller, application specific integrated circuit (ASIC), field programmable gate array, programmable logic device, etc. When implemented utilizing a processor executing software or firmware instructions, the software or firmware instructions may be stored on a computer readable medium, or media, such as a magnetic disk, an optical disk, a random access memory (RAM), a read only memory (ROM), a flash memory, a magnetic tape, etc. The software or firmware instructions may include machine readable instructions that, when executed by one or more processors, cause the one or more processors to perform various acts.

When implemented in hardware, the hardware may comprise one or more of i) discrete components, ii) one or more integrated circuits, iii) one or more application-specific integrated circuits (ASICs), iv) one or more programmable logic devices, etc.

While the present disclosure has been described with reference to specific examples, which are intended to be illustrative only and not to be limiting of the invention, changes, additions and/or deletions may be made to the disclosed embodiments without departing from the scope of the claims.

What is claimed is:

1. A method, comprising:
    associating, at a communication device, with a virtual access point (AP) implemented by a physical AP, the virtual AP corresponding to a first basic service set (BSS), wherein the first BSS corresponds to a first BSS identifier;
    in connection with an uplink (UL) orthogonal frequency division multiple access (OFDMA) transmission to the physical AP, generating, at the communication device, a signal having i) a physical layer (PHY) preamble with a field set to a value of a second BSS identifier, and ii) a PHY payload corresponding to the first BSS, wherein i) the value of the second BSS identifier is a BSS color value and ii) the second BSS identifier corresponds to all virtual APs implemented by the physical AP; and
    transmitting, with the communication device, the signal as part of the UL OFDMA transmission to the physical AP, wherein the signal is transmitted simultaneously with another signal, transmitted by another communication device, that is part of the UL OFDMA transmission to the physical AP and that includes a corresponding field of another PHY preamble, wherein i) the corresponding field of the other PHY preamble is set to the value of the second BSS identifier and ii) the other signal corresponds to another virtual AP implemented by the physical AP.

2. The method of claim 1, further comprising:
    receiving, at the communication device, a set of identifiers from the physical AP, wherein the set of identifiers include identifiers of BSSs corresponding to BSSs of a set of virtual APs implemented by the physical AP; and
    selecting the second BSS identifier from the set of identifiers received from the physical AP.

3. The method of claim 1, wherein:
    a first set of bits of the second BSS identifier is equal to a corresponding first set of bits of the first BSS identifier; and
    a second set of bits of the second BSS identifier is different than a corresponding second set of bits of the first BSS identifier.

4. The method of claim 3, further comprising generating the second BSS identifier, including:
    setting the first set of bits of the second BSS identifier equal to the corresponding first set of bits of the first BSS identifier; and
    setting the second set of bits of the second BSS identifier to a predetermined value that is different than the corresponding second set of bits of the first BSS identifier.

5. The method of claim 1, further comprising:
    exchanging, with the communication device, single user PHY data units with the physical AP, wherein the single user PHY data units include PHY preambles, each PHY preamble having a field including the first BSS identifier.

6. The method of claim 1, wherein the first BSS identifier is the BSS color value.

7. An apparatus, comprising:
    a network interface device associated with a communication device, having one or more integrated circuit devices configured to
        associate with a virtual access point (AP) implemented by a physical AP, the virtual AP corresponding to a first basic service set (BSS), wherein the first BSS corresponds to a first BSS identifier,
        in connection with an uplink (UL) orthogonal frequency division multiple access (OFDMA) transmission to the physical AP, generate a signal having i) a physical layer (PHY) preamble with a field set to a value of a second BSS identifier, and ii) a PHY payload corresponding to the first BSS, wherein i) the value of the second BSS identifier is a BSS color value and ii) the second BSS identifier corresponds to all virtual APs implemented by the physical AP, and
        transmit the signal as part of the UL OFDMA transmission to the physical AP, wherein the signal is transmitted simultaneously with another signal, transmitted by another communication device, that is part of the UL OFDMA transmission to the physical AP and that includes a corresponding field of another PHY preamble, wherein i) the corresponding field of the other PHY preamble is set to the value of the second BSS identifier and ii) the other signal corresponds to another virtual AP implemented by the physical AP.

8. The apparatus of claim 7, wherein the one or more integrated circuit devices are configured to:
    receive a set of identifiers from the physical AP, wherein the set of identifiers include identifiers of BSSs corresponding to BSSs of a set of virtual APs implemented by the physical AP; and
    select the second BSS identifier from the set of identifiers received from the physical AP.

9. The apparatus of claim 7, wherein:
    a first set of bits of the second BSS identifier is equal to a corresponding first set of bits of the first BSS identifier; and
    a second set of bits of the second BSS identifier is different than a corresponding second set of bits of the first BSS identifier.

10. The apparatus of claim 9, wherein the one or more integrated circuit devices are configured to:
    set the first set of bits of the second BSS identifier equal to the corresponding first set of bits of the first BSS identifier; and
    set the second set of bits of the second BSS identifier to a predetermined value that is different than the corresponding second set of bits of the first BSS identifier.

11. The apparatus of claim 7, wherein the one or more integrated circuit devices are configured to:
    exchange single user PHY data units with the physical AP, wherein the single user PHY data units include PHY preambles, each PHY preamble having a field including the first BSS identifier.

12. The apparatus of claim 7, wherein the network interface device comprises one or more transceivers.

13. The apparatus of claim 12, further comprising:
    one or more antennas coupled to the one or more transceivers.

14. The apparatus of claim 7, wherein the first BSS identifier is the BSS color value.

* * * * *